US012694300B2

(12) United States Patent
Zhou et al.

(10) Patent No.: US 12,694,300 B2
(45) Date of Patent: Jul. 28, 2026

(54) SERVERS, METHODS AND SYSTEMS FOR FAIR AND SECURE VERTICAL FEDERATED LEARNING

(71) Applicants: Zirui Zhou, Surrey (CA); Changxin Liu, Victoria (CA); Yong Zhang, Richmond (CA)

(72) Inventors: Zirui Zhou, Surrey (CA); Changxin Liu, Victoria (CA); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 994 days.

(21) Appl. No.: 17/940,606

(22) Filed: Sep. 8, 2022

(65) Prior Publication Data
US 2023/0084507 A1     Mar. 16, 2023

Related U.S. Application Data

(60) Provisional application No. 63/242,004, filed on Sep. 8, 2021.

(51) Int. Cl.
*G06N 3/098*     (2023.01)
*G06N 20/00*     (2019.01)

(52) U.S. Cl.
CPC .............. *G06N 3/098* (2023.01); *G06N 20/00* (2019.01)

(58) Field of Classification Search
CPC .............................. G06N 3/098; G06N 20/00
See application file for complete search history.

(56) References Cited

U.S. PATENT DOCUMENTS

| | | | |
|---|---|---|---|
| 11,836,583 B2 | 12/2023 | Chu et al. | |
| 2021/0073678 A1* | 3/2021 | Chu ...................... | G06N 3/045 |
| 2021/0174243 A1* | 6/2021 | Angel .................... | H04L 9/083 |
| 2022/0114475 A1* | 4/2022 | Zhu ........................ | G16H 50/70 |
| 2022/0129706 A1* | 4/2022 | Vivona ................ | G06N 3/0475 |
| 2022/0383091 A1* | 12/2022 | Das ........................ | G06N 3/084 |
| 2023/0028606 A1* | 1/2023 | Cheng ................... | H04L 9/0869 |
| 2023/0073235 A1* | 3/2023 | Wang ................... | G06F 21/6245 |
| 2024/0330705 A1* | 10/2024 | Qi ........................ | G06N 3/0464 |

OTHER PUBLICATIONS

Wang et al., "Federated Learning with Fair Averaging" Jun. 16, 2021, arXiv: 2104.14937v5, pp. 1-9. (Year: 2021).*

(Continued)

*Primary Examiner* — Miranda M Huang
*Assistant Examiner* — Chase P. Hinckley

(57) ABSTRACT
Servers, methods and systems are disclosed for fair and secure vertical federated learning. Fair and secure vertical federated learning (FSVFL) systems are disclosed that achieve one or more of the following properties: model fairness, high security, high accuracy, high efficiency, and/or high generality. Private data is retained on local computing systems, which share only their model outputs, and a server or a trusted computing system shares only model gradients and randomly partitioned sets of data sample identifiers with untrusted computing systems. A fairness constraint protects protected classes of data samples against model training resulting in bias on the basis of the protected classes.

20 Claims, 11 Drawing Sheets

(56)　　　　References Cited

OTHER PUBLICATIONS

Sun et al., "Vertical Federated Learning without Revealing Intersection Membership" Jun. 10, 2021, arXiv: 2106.05508v1, pp. 1-21. (Year: 2021).*

Mohri et al., "Agnostic Federated Learning" Feb. 1, 2019, arXiv: 1902.00146v1, pp. 1-30. (Year: 2019).*

Yue et al., "GIFAIR-FL: An Approach for Group and Individual Fairness in Federated Learning" Aug. 5, 2021, arXiv: 2108.02741v1, pp. 1-39. (Year: 2021).*

Cui et al., "Fair and Consistent Federated Learning" Aug. 19, 2021, arXiv: 2108.08435v1, pp. 1-17. (Year: 2021).*

Feng et Yu., "Multi-Participant Multi-Class Vertical Federated Learning" Jan. 30, 2020, arXiv: 2001.11154v1, pp. 1-7. (Year: 2020).*

Yang et al., "Federated Machine Learning: Concept and Applications" Jan. 2019, pp. 1-19. (Year: 2019).*

Zhang et al., "Aegis: A Trusted, Automatic and Accurate Verification Framework for Vertical Federated Learning" Aug. 23, 2021, arXiv: 2108.06958v2, pp. 1-7. (Year: 2021).*

Abay et al., "Mitigating Bias in Federated Learning" Dec. 4, 2020, arXiv: 2012.02447v1, pp. 1-16. (Year: 2020).*

Chen et al., "VAFL: a Method of Vertical Asynchronous Federated Learning" Jul. 12, 2020, arXiv: 2007.06081v1, pp. 1-22. (Year: 2020).*

Mugunthan et al., "Multi-VFL: A Vertical Federated Learning System for Multiple Data and Label Owners" Jun. 17, 2021, arXiv: 2106.05468v2, pp. 1-5. (Year: 2021).*

Zhu et al., "PIVODL: Privacy-preserving vertical federated learning over distributed labels" Aug. 25, 2021, arXiv: 2108.11444v1, pp. 1-13. (Year: 2021).*

Padala et al., "Federated Learning Meets Fairness and Differential Privacy" Aug. 23, 2021, arXiv: 2108.09932v1, pp. 1-12. (Year: 2021).*

Du et al., "Fairness-aware Agnostic Federated Learning" Oct. 10, 2020, arXiv: 2010.05057v1, pp. 1-12. (Year: 2020).*

Xu et Lyu, "A Reputation Mechanism is All You Need: Collaborative Fairness and Adversarial Robustness in Federated Learning" Jul. 27, 2021, arXiv: 10464v2, pp. 1-13. (Year: 2021).*

Yao et al., "Federated Learning with Unbiased Gradient Aggregation and Controllable Meta Updating" Dec. 16, 2020, arXiv: 1910.08234v3, pp. 1-16. (Year: 2020).*

Hong et al., "Federated Adversarial Debiasing for Fair and Transferable Representations" Aug. 2021, pp. 617-627. (Year: 2021).*

Mohassel, Payman, et al., "SecureML" A System for Scalable Privacy-Preserving Machine Learning, University of Maryland. In IEEE Symposium on Security and Privacy (SP), 19-38.

* cited by examiner

110 Server

124 Storage

128 Memory

129 Instructions

125 Federated learning module

126 Global model

127 Stored global learned parameters

114 Processing device

122 Network interface

102 Computing System

130 Processing device

132 Network interface

134 Storage

138 Memory

139 Instructions

136 Local model

137 Stored local learned parameters

140 Local dataset

400

750

SERVERS, METHODS AND SYSTEMS FOR FAIR AND SECURE VERTICAL FEDERATED LEARNING

RELATED APPLICATIONS

The present application claims priority to U.S. provisional patent application Ser. No. 63/242,004 filed Sep. 8, 2021, the entire contents of which are incorporated herein by reference.

FIELD

The present disclosure relates to servers, methods and systems for training of a machine learning-based model, in particular related to servers, methods and systems for fair and secure vertical federated learning.

BACKGROUND

Federated learning (FL) is a machine learning technique in which multiple computing systems of different data owners participate in training a machine learning algorithm to learn a centralized global model (maintained at a server) without sharing their data with the server. The data of the data owners is private in nature (e.g., photos, health data, social media data, banking data, retail data, etc.). FL helps with preserving the privacy of such data by enabling the centralized global model to be trained (i.e., enabling the learnable parameters (e.g. weights and biases) of the centralized global model to be set to values that result in accurate performance of the centralized global model at inference) without requiring the computing systems of the data owners to share their private data with the server. Instead, the computing system of data owner performs localized training of a local model using a machine learning algorithm and its respective set of the local data (referred to as a "local dataset") to learn values of the learnable parameters of the local model, and transmits information to be used to adjust the learned values of the learnable parameters of the centralized global model back to the server. The server adjusts the learned values of the learnable parameters of the centralized global model based on local learned parameter information received from the computing systems of each of the data owners. Successful practical implementation of FL in real-world applications would enable the large amount of private data that is collected by computing systems (e.g. computing devices of data owners) to be leveraged for the purposes of training a centralized global model.

Improvements to systems and method for federated learning are desirable.

SUMMARY

In various examples, the present disclosure describes servers, methods and systems for fair and secure vertical federated learning.

Embodiments described herein may thereby solve the technical problem of providing a fair and secure vertical federated learning (FSVFL) system that achieves one or more of the following properties:

MODEL FAIRNESS: In the FSVFL, the trained machine learning model satisfies a fairness metric.

HIGH SECURITY: In the FSVFL, an entity can only obtain the model output of a given data owner's local model. It is impossible for an entity to acquire any private information of a data owner, such as the data owner's private data or the learnable parameter values of the data owner's local model.

HIGH ACCURACY: Computation conducted in the FSVFL is accurate.

HIGH EFFICIENCY: Computation and communication conducted in the FSVFL is efficient.

HIGH GENERALITY: The FSVFL can be applied to various machine learning models.

As used herein, the term "machine learning" or "ML" may refer to a type of artificial intelligence that makes it possible for software programs to become more accurate at making predictions without explicitly programming them to do so.

As used herein, the term "model" may refer to a predictive model for performing an inference task (also called a prediction task), such as classification or generation of data. A model may be said to be implemented, embodied, run, or executed by an algorithm, computer program, or computational structure or device. In the present example embodiments, unless otherwise specified a model refers to a "machine learning model", i.e., a predictive model implemented by an algorithm trained using deep learning or other machine learning techniques, such as a deep neural network (DNN).

As used herein, an "input sample" may refer to any data sample used as an input to a machine learning model, such as image data. It may refer to a training data sample used to train a machine learning model, or to a data sample provided to a trained machine learning model which will infer (i.e. predict) an output based on the data sample for the task for which the machine learning model has been trained. Thus, for a machine learning model that performs a task of image classification, an input sample may be a single digital image.

As used herein, the terms "model output" or "output" may refer to an inference output of a model, such as a predicted classification distribution over a set of classes, data generated by a generative model, etc.

As used herein, the term "training" may refer to a procedure in which an algorithm uses historical data to extract patterns from them and learn to distinguish those patterns in as yet unseen data. Machine learning uses training to generate a trained model capable of performing a specific inference task. In many forms of machine learning, training data samples are provided to the model, and an objective function or critic is applied to the model outputs, with the results being used to adjust the learnable parameters of the model. As used herein, the terms "objective function" and "loss function" both refer to an objective function used in training a model, an objective metric generated by an objective function may also be referred to interchangeably as a loss.

As used herein, the term "protected group" may refer to a group of data samples with sensitive features.

As used herein, the term "protected class" may refer to a class of ground truth labels associated with sensitive features.

As used herein, the terms "fair", "fairness", or "model fairness" may refer to an attribute of a model wherein the learned model does not exhibit bias in its predictions on the basis of a protected class, or wherein the degree of such bias falls below a threshold.

As used herein, a statement that an element is "for" a particular purpose may mean that the element performs a certain function or is configured to carry out one or more particular steps or operations, as described herein.

As used herein, statements that a second element is "based on" a first element may mean that characteristics of the second element are affected or determined at least in part by characteristics of the first element. The first element may be considered an input to an operation or calculation, or a series of operations or computations, which produces the second element as an output that is not independent from the first element.

In some aspects, the present disclosure describes a method for training a primary machine learning model using vertical federated learning. A plurality of labels are obtained. Each label identifies a ground truth prediction for a feature of a data sample of a plurality of data samples. Protected class information identifying one or more protected classes is obtained. From each computing system of a plurality of computing systems, an output of a local machine learning model of the computing device based on a local dataset of the computing device is obtained. The outputs of the plurality of computing devices are processed to generate a prediction. The prediction and the one or more labels are processed to generate a loss. The loss and the protected class information are processed to generate an unfairness measure indicating a degree to which the prediction is affected by a given data sample's positive membership in a protected class. The loss is processed to generate a local loss gradient for training the primary machine learning model. The unfairness measure is processed to generate a local unfairness gradient for training the primary machine learning model. A plurality of learnable parameters of the primary machine learning model are adjusted based on the local loss gradient and the local unfairness gradient.

In some aspects, the present disclosure describes a server comprising a processing device, and a memory storing thereon machine-executable instructions. The instructions, when executed by the processing device, cause the server to train a primary machine learning model stored on a task owner computing system using vertical federated learning. A plurality of labels are obtained. Each label identifies a ground truth prediction for a feature of a data sample of a plurality of data samples. Protected class information identifying one or more protected classes is obtained. From each computing system of a plurality of computing systems, an output of a local machine learning model of the computing device based on a local dataset of the computing device is obtained. The outputs of the plurality of computing devices are processed to generate a prediction. The prediction and the one or more labels are processed to generate a loss. The loss and the protected class information are processed to generate an unfairness measure indicating a degree to which the prediction is affected by a given data sample's positive membership in a protected class. The loss is processed to generate a local loss gradient for training the primary machine learning model. The unfairness measure is processed to generate a local unfairness gradient for training the primary machine learning model. The local loss gradient and the local unfairness gradient are sent to the task owner computing system for training of the primary machine learning model.

In some aspects, the present disclosure describes a non-transitory computer-readable medium having instructions tangibly stored thereon which, when executed by a processor of a server, cause the server to train a primary machine learning model stored on a task owner computing system using vertical federated learning. A plurality of labels are obtained. Each label identifies a ground truth prediction for a feature of a data sample of a plurality of data samples. Protected class information identifying one or more protected classes is obtained.

From each computing system of a plurality of computing systems, an output of a local machine learning model of the computing device based on a local dataset of the computing device is obtained. The outputs of the plurality of computing devices are processed to generate a prediction. The prediction and the one or more labels are processed to generate a loss. The loss and the protected class information are processed to generate an unfairness measure indicating a degree to which the prediction is affected by a given data sample's positive membership in a protected class. The loss is processed to generate a local loss gradient for training the primary machine learning model. The unfairness measure is processed to generate a local unfairness gradient for training the primary machine learning model. The local loss gradient and the local unfairness gradient are sent to the task owner computing system for training of the primary machine learning model.

In some examples, the method further comprises generating partition data identifying one or more positive data samples of the plurality of data samples. Each positive data sample is associated with a label having a positive ground truth prediction indicating positive membership of the data sample in a class of a plurality of classes. For each of one or more passive computing systems of the plurality of computing systems, a local loss gradient is computed for training the local machine learning model of the passive computing system. For each of one or more passive computing systems of the plurality of computing systems, a local unfairness gradient for training the local machine learning model of the passive computing system I computed. The partition data, the local loss gradient, and the local unfairness gradient are sent to the passive computing system. A set of patched local gradients for the local machine learning model of the passive computing system, based on the local unfairness gradient, are received. The patched local gradients are processed to compute a further unfairness gradient. The further unfairness gradient is sent to the passive computing system.

In some examples, the plurality of local machine learning models includes the primary machine learning model. The plurality of computing systems includes a task owner computing system comprising the primary machine learning model. Processing the outputs of the plurality of computing devices to generate a prediction comprises providing the outputs to a global machine learning model to generate a global prediction. The local loss gradient for training the primary machine learning model is generated by processing the loss and the global machine learning model. The local unfairness gradient for training the primary machine learning model is generated by processing the unfairness measure and the global machine learning model. Adjusting the plurality of learnable parameters of the primary machine learning model based on the local loss gradient and the local unfairness gradient comprises sending the local loss gradient and the local unfairness gradient to the task owner computing system, and, at the task owner computing system, adjusting the plurality of learnable parameters of the primary machine learning model based on the local loss gradient and the local unfairness gradient.

In some examples, the plurality of local machine learning models includes the primary machine learning model. The plurality of computing systems includes a task owner computing system comprising the primary machine learning model. Processing the outputs of the plurality of computing devices to generate a prediction comprises summing the outputs to generate the prediction. The prediction is an aggregated prediction. The local loss gradient for training the primary machine learning model is generated by processing the loss and the aggregated prediction. The local unfairness gradient for training the primary machine learning model is generated by processing the unfairness measure and the aggregated prediction. Adjusting the plurality of learnable parameters of the primary machine learning model based on the local loss gradient and the local unfairness gradient comprises sending the local loss gradient and the local unfairness gradient to the task owner computing system, and, at the task owner computing system, adjusting the plurality of learnable parameters of the primary machine learning model based on the local loss gradient and the local unfairness gradient.

In some examples, the plurality of local machine learning models includes the primary machine learning model. The plurality of computing systems includes a task owner computing system comprising the primary machine learning model. Obtaining the outputs of the plurality of computing devices comprises: receiving the outputs at a server, and sending the outputs from the server to the task owner computing system. Processing the outputs of the plurality of computing devices to generate a prediction comprises summing the outputs, at the task owner computing system, to generate the prediction. The prediction is an aggregated prediction. The local loss gradient for training the primary machine learning model is generated by processing the loss and the aggregated prediction. The local unfairness gradient for training the primary machine learning model is generated by processing the unfairness measure and the aggregated prediction at the task owner computing system. Adjusting the plurality of learnable parameters of the primary machine learning model based on the local loss gradient and the local unfairness gradient comprises, at the task owner computing system, adjusting the plurality of learnable parameters of the primary machine learning model based on the local loss gradient and the local unfairness gradient.

In some examples, the unfairness measure is a difference in equal opportunity (DEO) measure.

In some examples, the prediction is a multi-dimensional prediction comprising a prediction with respect to each data sample of a plurality of data samples represented in the local datasets.

In some examples, the plurality of data samples represented in the local datasets comprise a plurality of vertically partitioned data samples.

In some examples, the method further comprises repeating one or more times the steps of: obtaining the outputs, processing the outputs, generating the loss, generating the unfairness measure, generating the local loss gradient, generating the local unfairness gradient, and adjusting the plurality of learnable parameters of the primary machine learning model.

In some examples, the method further comprises repeating one or more times the steps of: obtaining the outputs, processing the outputs, generating the loss, generating the unfairness measure, generating the local loss gradient, generating the local unfairness gradient, adjusting the plurality of learnable parameters of the primary machine learning model, generating the partition data, and for each passive computing system, the steps of: computing the local loss gradient, computing the local unfairness gradient, sending the partition data, the local loss gradient, and the local unfairness gradient to the passive computing system, receiving the set of patched local gradients, computing the further unfairness gradient, and sending the further unfairness gradient to the passive computing system.

In some examples, the method further comprises, for each passive computing system a further set of steps at the passive computing system. The local unfairness gradient is processed, using the local machine learning model, to generate the set of patched local gradients. The set of patched local gradients is sent. The further unfairness gradient is received. A plurality of learnable parameters of the local machine learning model is adjusted based on the further unfairness gradient.

In some examples, the machine-executable instructions, when executed by the processing device, further cause the server to generate partition data identifying one or more positive data samples of the plurality of data samples. Each positive data sample is associated with a label having a positive ground truth prediction indicating positive membership of the data sample in a class of a plurality of classes. For each of one or more passive computing systems of the plurality of computing systems: a local loss gradient is computed for training the local machine learning model of the passive computing system. A local unfairness gradient is computed for training the local machine learning model of the passive computing system. The partition data, the local loss gradient, and the local unfairness gradient are sent to the passive computing system. A set of patched local gradients for the local machine learning model of the passive computing system, based on the local unfairness gradient, are received. The patched local gradients are processed to compute a further unfairness gradient. The further unfairness gradient is sent to the passive computing system.

In some examples, the memory stores a global machine learning model. The plurality of local machine learning models includes the primary machine learning model. The plurality of computing systems includes the task owner computing system. Processing the outputs of the plurality of computing devices to generate a prediction comprises providing the outputs to a global machine learning model to generate a global prediction. The local loss gradient for training the primary machine learning model is generated by processing the loss and the global machine learning model. The local unfairness gradient for training the primary machine learning model is generated by processing the unfairness measure and the global machine learning model.

In some examples, the plurality of local machine learning models includes the primary machine learning model. The plurality of computing systems includes the task owner computing system. Processing the outputs of the plurality of computing devices to generate a prediction comprises summing the outputs to generate the prediction. The prediction is an aggregated prediction. The local loss gradient for training the primary machine learning model is generated by processing the loss and the aggregated prediction. The local unfairness gradient for training the primary machine learning model is generated by processing the unfairness measure and the aggregated prediction.

In some examples, the unfairness measure is a difference in equal opportunity (DEO) measure.

In some examples, the prediction is a multi-dimensional prediction comprising a prediction with respect to each data sample of a plurality of data samples represented in the local datasets.

In some examples, the plurality of data samples represented in the local datasets comprise a plurality of vertically partitioned data samples.

In some examples, the machine-executable instructions, when executed by the processing device, further cause the server to repeating one or more times the steps of: obtaining the outputs, processing the outputs, generating the loss, generating the unfairness measure, generating the local loss gradient, generating the local unfairness gradient, and sending the local loss gradient and the local unfairness gradient to the task owner computing system.

In some aspects, the present disclosure describes a non-transitory computer-readable medium having instructions tangibly stored thereon which, when executed by a processor of a server, cause the server to perform the steps of at least one of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF THE INVENTION

In examples disclosed herein, methods and systems are described that help to enable practical application of vertical federated learning (FL). The disclosed examples may help to address challenges that are unique to vertical FL and in particular to provide a fair and secure vertical FL system. To assist in understanding the present disclosure, FIG. 1 is first discussed.

Figure 1:
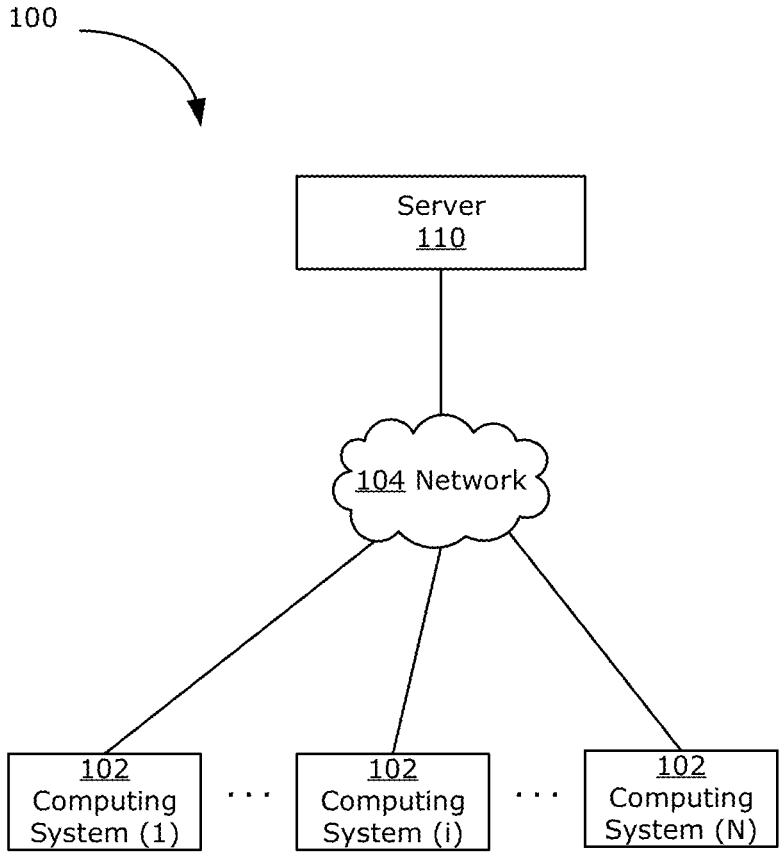
FIG. 1 is a block diagram of an example system that may be used to implement vertical federated learning.

FIG. 1 illustrates an example system 100 that may be used to implement vertical FL. The system 100 has been simplified in this example for ease of understanding; generally, there may be more entities and components in the system 100 than those shown in FIG. 1.

The system 100 includes a plurality of computing systems 102 wherein each computing system 102 is controlled by one of a plurality of different data owners. The computing system 102 of each data owner collects and stores a respective set of private data (also referred to as a local dataset or private dataset). Each computing system 102 can run a machine learning algorithm to learn values of learnable parameters of a local model using its respective set of local data (i.e., its local dataset). For the purposes of the present disclosure, running a machine learning algorithm at a computing system 102 means executing computer-readable instructions of a machine learning algorithm to adjust the values of the learnable parameters of a local model. Examples of machine learning algorithms include supervised learning algorithms, unsupervised learning algorithms, and reinforcement learning algorithms. For generality, there may be N computing system 102 (N being any integer larger than 1) and hence N sets of local data (also called local datasets). The local datasets are typically unique and distinct from each other, and it may not be possible to infer the characteristics or distribution of any one local dataset based on any other local dataset. A computing system 102 may be a server, a collection of servers, an edge device, an end user device (which may include such devices (or may be referred to) as a client device/terminal, user equipment/device (UE), wireless transmit/receive unit (WTRU), mobile station, fixed or mobile subscriber unit, cellular telephone, station (STA), personal digital assistant (PDA), smartphone, laptop, computer, tablet, wireless sensor, wearable device, smart device, machine type communications device, smart (or connected) vehicles, or consumer electronics device, among other possibilities), or may be a network device (which may include (or may be referred to as) a base station (BS), router, access point (AP), personal basic service set (PBSS) coordinate point (PCP), eNodeB, or gNodeB, among other possibilities). In the case wherein a computing system 102 is an end user device, the local dataset at the computing system 102 may include local data that is collected or generated in the course of real-life use by user(s) of the computing system 102 (e.g., captured images/videos, captured sensor data, captured tracking data, etc.). In the case wherein a computing system 102 is a network device, the local data included in the local dataset at the computing system 102 may be data that is collected from end user devices that are associated with or served by the network device. For example, a computing system 102 that is a BS may collect data from a plurality of user devices (e.g., tracking data, network usage data, traffic data, etc.) and this may be stored as local data in the local dataset on the BS.

The computing systems 102 communicate with the server 110 via a network 104. The network 104 may be any form of network (e.g., an intranet, the Internet, a P2P network, a WAN and/or a LAN) and may be a public network. Different computing systems 102 may use different networks to communicate with the server 110, although only a single network 104 is illustrated for simplicity.

The server 110 may be used to train a centralized global model (referred to hereinafter as a global model) using FL. The term "server", as used herein, is not intended to be limited to a single hardware device: the server 110 may include a server device, a distributed computing system, a virtual machine running on an infrastructure of a datacenter, or infrastructure (e.g., virtual machines) provided as a service by a cloud service provider, among other possibilities. Generally, the server 110 (including the federated learning module 125 discussed further below) may be implemented using any suitable combination of hardware and software, and may be embodied as a single physical apparatus (e.g., a server device) or as a plurality of physical apparatuses (e.g., multiple machines sharing pooled resources such as in the case of a cloud service provider). The server 110 may implement techniques and methods to learn values of the learnable parameters of the global model using FL as described herein. In some examples, the server 110 and one or more of the computing systems 102 may be implemented on a single platform or device under the control of a single user.

Figure 2A:
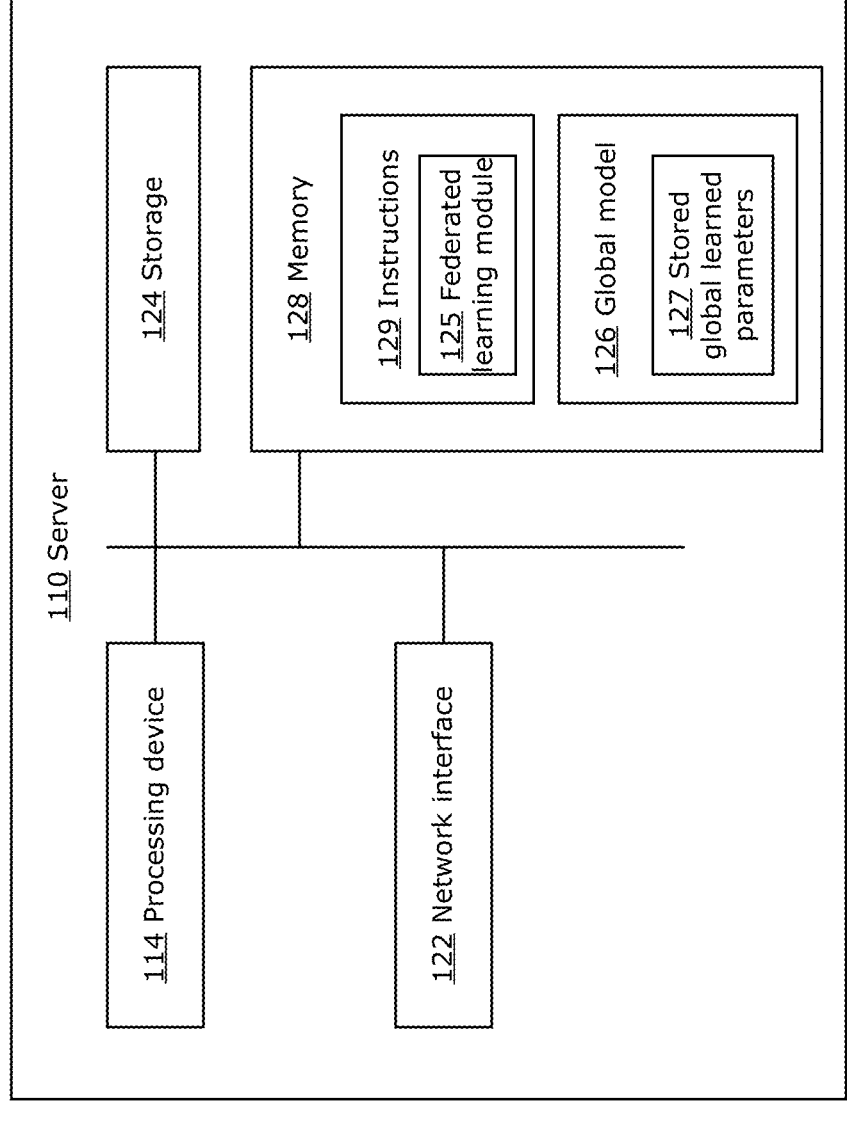
FIG. 2A is a block diagram of an example server that may be used to implement examples described herein.

FIG. 2A is a block diagram illustrating a simplified example implementation of the server 110. Other examples suitable for implementing embodiments described in the present disclosure may be used, which may include components different from those discussed below. Although FIG. 2A shows a single instance of each component, there may be multiple instances of each component in the server 110.

The server 110 may include one or more processing devices 114, such as a processor, a microprocessor, a digital signal processor, an application-specific integrated circuit (ASIC), a field-programmable gate array (FPGA), a dedicated logic circuitry, a dedicated artificial intelligence processor unit, a tensor processing unit, a neural processing unit, a hardware accelerator, or combinations thereof. The one or more processing devices 114 may be jointly referred to herein as a processor 114, processor device 114, or processing device 114.

The server 110 may include one or more network interfaces 122 for wired or wireless communication with the network 104, the computing systems 102, or other entity in the system 100. The network interface(s) 122 may include wired links (e.g., Ethernet cable) and/or wireless links (e.g., one or more antennas) for intra-network and/or inter-network communications.

The server 110 may also include one or more storage units 124, which may include a mass storage unit such as a solid state drive, a hard disk drive, a magnetic disk drive and/or an optical disk drive.

The server 110 may include one or more memories 128, which may include a volatile or non-volatile memory (e.g., a flash memory, a random access memory (RAM), and/or a read-only memory (ROM)). The one or more non-transitory memories 128 may be jointly referred to herein as a memory 128 for simplicity. The memory 128 may store processor executable instructions 129 for execution by the processing device(s) 114, such as to carry out examples described in the present disclosure. The memory 128 may include other software stored as processor executable instructions 129, such as for implementing an operating system and other applications/functions. In some examples, the memory 128 may include processor executable instructions 129 for execution by the processor 114 to implement a federated learning module 125 (for performing FL), as discussed further below. In some examples, the server 110 may additionally or alternatively execute instructions from an external memory (e.g., an external drive in wired or wireless communication with the server) or may be provided processor executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The memory 128 may also store a global model 126 trained to perform a task. The global model 126 includes a plurality of learnable parameters 127 (referred to as "global learnable parameters" 127), such as learned weights and biases of a neural network, whose values may be adjusted during the training process until the global model 126 converges on a set of global learned parameter values representing an optimized solution to the task which the global model 126 is being trained to perform. In addition to the global learnable parameters 127, the global model 126 may also include other data, such as hyperparameters, which may be defined by an architect or designer of the global model 126 (or by an automatic process) prior to training, such as at the time the global model 126 is designed or initialized. In machine learning, hyperparameters are parameters of a model that are used to control the learning process; hyperparameters are defined in contrast to learnable parameters, such as weights and biases of a neural network, whose values are adjusted during training.

Figure 2B:
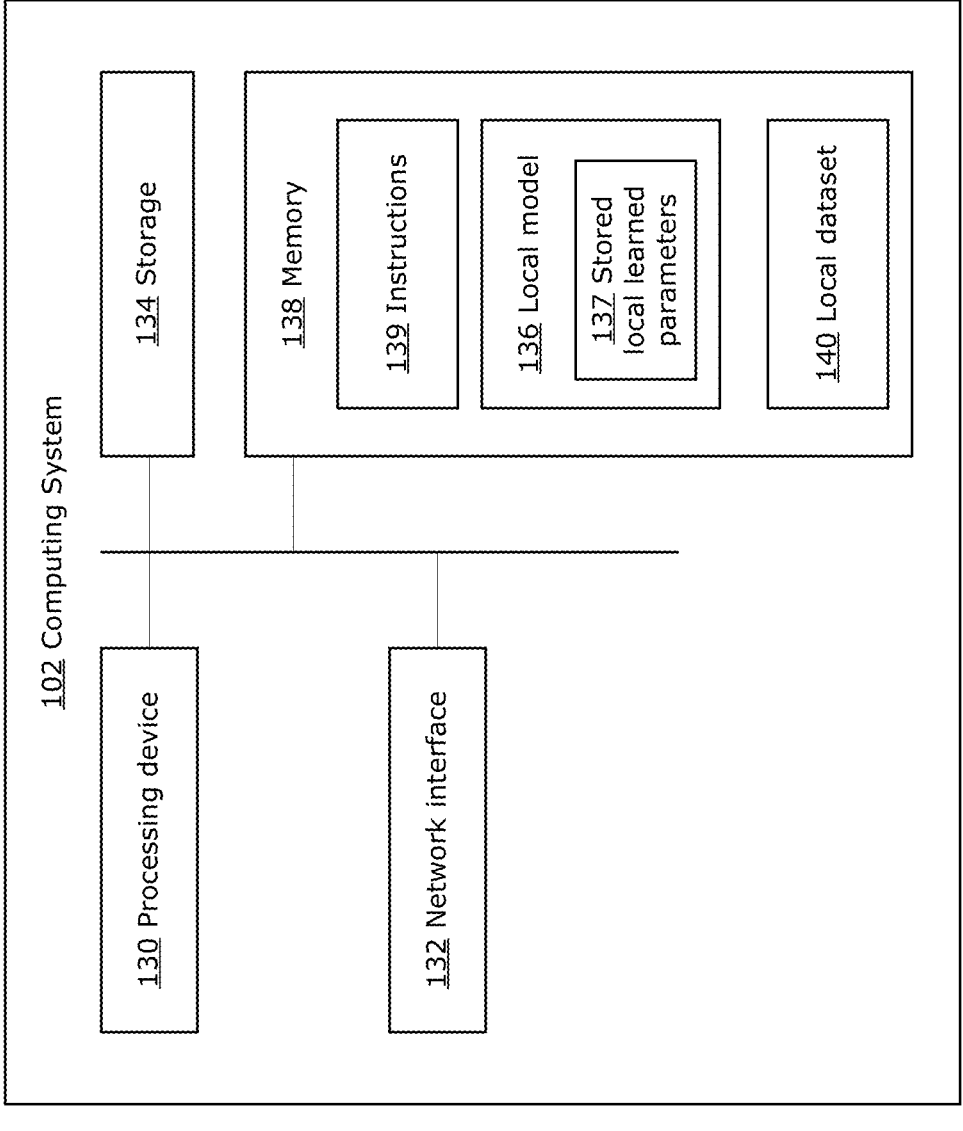
FIG. 2B is a block diagram of an example computing system that may be used as part of examples described herein.

FIG. 2B is a block diagram illustrating a simplified example implementation of a computing system 102. Other examples suitable for implementing embodiments described in the present disclosure may be used, which may include components different from those discussed below. Although FIG. 2B shows a single instance of each component, there may be multiple instances of each component in the computing system 102.

The computing system 102 may include one or more processing devices 130 (also referred to herein as processor 130), one or more network interfaces 132, one or more storage units 134, and one or more non-transitory memories 138 (also referred to herein as memory 138), which may each be implemented using any suitable technology such as those described in the context of the server 110 above.

The memory 138 may store processor executable instructions 139 for execution by the processor 130, such as to carry out examples described in the present disclosure. The memory 138 may include other software stored as processor executable instructions 139, such as for implementing an operating system and other applications/functions. In some examples, the memory 138 may include processor executable instructions 139 for execution by the processing device 130 to implement client-side operations of a federated learning system in conjunction with the federated learning module 125 executed by the server 110, as discussed further below.

The memory 138 may also store a local model 136 trained to perform the same task as the global model 126 of the server 110. The local model 136 includes a plurality of learnable parameters 137 (referred to as "local learnable parameters" 137), such as learned weights and biases of a neural network, whose values may be adjusted during a local training process based on the local dataset 140 until the local model 136 converges on a set of local learned parameter values representing an optimized solution to the task which the local model 136 is being trained to perform. In addition to the local learnable parameters 137, the local model 136 may also include other data, such as hyperparameters matching those of the global model 126 of the server 110, such that the local model 136 has the same architecture and operational hyperparameters as the global model 126, and differs from the global model 126 only in the values of its local learnable parameters 137, i.e. the values of the local learnable parameters stored in the memory 138 after local training are stored as the learned values of the local learnable parameters 137.

Vertical federated learning (VFL) is a learning process in which at least some of the private data $\mathcal{D}_1, \ldots, \mathcal{D}_N$ of the data owners $\mathcal{F}_1, \ldots, \mathcal{F}_N$ is vertically partitioned. Vertically partitioned data is data in which two or more of the private datasets $\mathcal{D}_1, \ldots, \mathcal{D}_N$ each contain a different subset of features of a common set of data samples. The subsets of features contained in $\mathcal{D}_1, \ldots, \mathcal{D}_N$ may or may not overlap with each other.

Figure 2C:
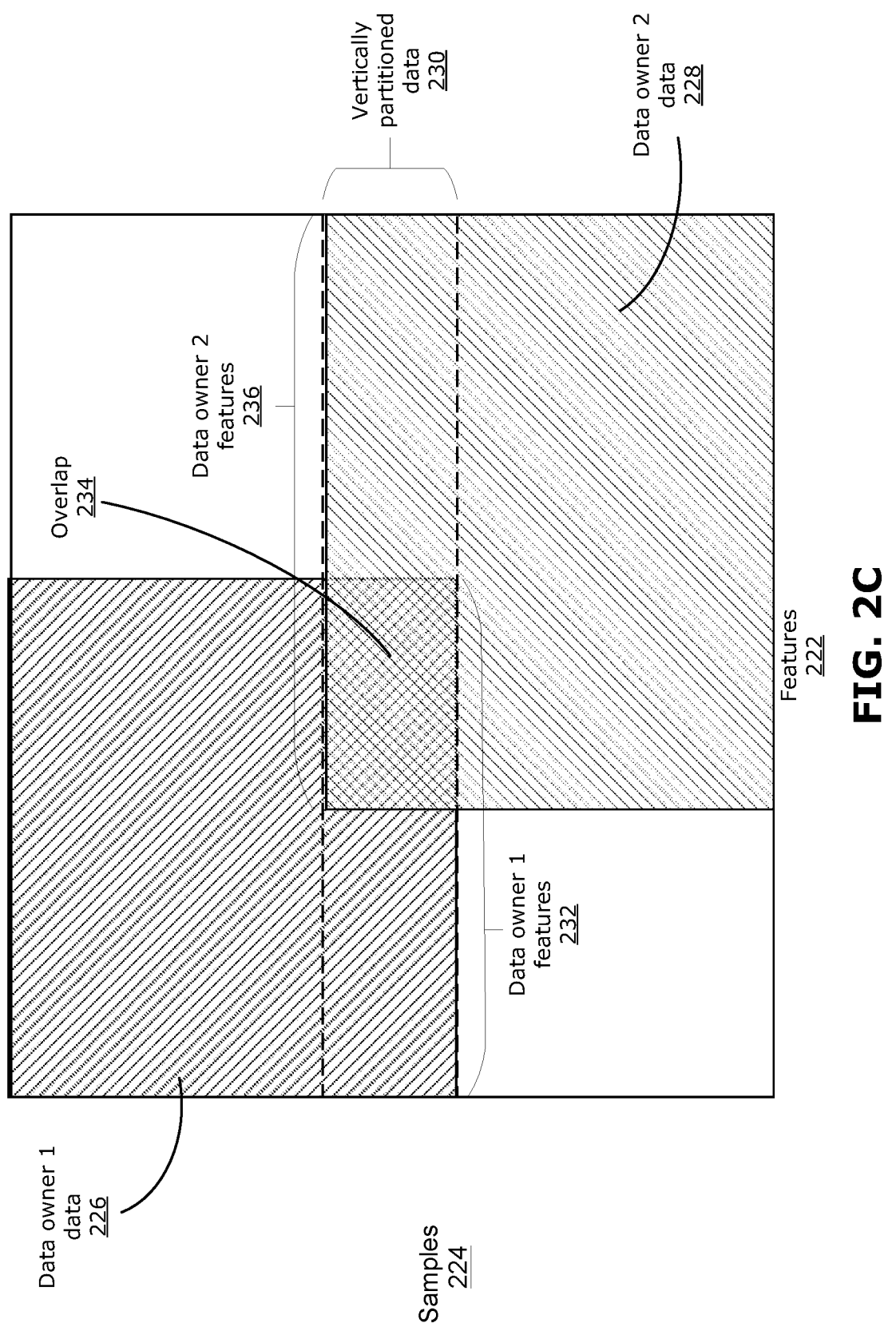
FIG. 2C illustrates an example of vertically partitioned data present in the aggregated data of a first data and the data of a second data owner that may be used as part of examples described herein.

FIG. 2C illustrates an example of vertically partitioned data 230 present in the aggregated data of a first data owner (data owner 1 data 226) and the data of a second data owner (data owner 2 data 228). The vertically partitioned data 230 consists of those data samples 224 for which both data owner 1 and data owner 2 have data, wherein the set of features 222 present in the data owner 1 data 226, i.e. data owner 1 features 232, is distinct from the set of features 222 present in the data owner 2 data 228 i.e. data owner 2 features 236. As described above, there may or may not be an overlap 234 of the data owner 1 features 232 and the data owner 2 features 236. However, in order for data to be considered vertically partitioned data 230, the data owner 1 features 232 and data owner 2 features 236 must not overlap entirely (i.e., they must not be identical sets of features).

Conventionally, in performing federated learning, the vertically partitioned data 230 is aggregated (e.g., at a server) into an aggregated data set $\mathcal{D} = \mathcal{D}_1 \cup \ldots \cup \mathcal{D}_N$, which is used to train a model $\mathcal{M}_{SUM}$. However, this technique requires that each local dataset must be exposed to the server performing the training, thereby exposing sensitive local data.

In contrast, examples described herein may preserve the privacy of the local datasets when training a model using vertically partitioned data 230. In some examples described herein, none of the computing systems 102 of data owners $\mathcal{F}_1, \ldots, \mathcal{F}_N$ exposes its respective private data $\mathcal{D}_1, \ldots, \mathcal{D}_N$ or model parameters, but the computing systems 102 of all the data owners collaboratively use their private data $\mathcal{D}_1, \ldots, \mathcal{D}_N$ to train a model $\mathcal{M}_{FED}$ which has comparable performance to a hypothetical model $\mathcal{M}_{SUM}$ which had been trained using data collected from the computing systems of the data owners. Thus, some examples described herein may be described as secure, because they protect the privacy of local datasets.

Furthermore, some examples described herein may exhibit model fairness. Machine learning (ML) models are increasingly used by social institutions to make important decisions that affect people's lives and implicate people's interests. For instance, banks may rely on ML models that use clients' financial and personal data to predict eligibility for loans, companies may rely on ML models to aid in making hiring decisions based on candidates' data and profiles, and courts may rely on ML models to decide parole eligibility for prisoners based on their personal information.

A dataset used to train ML models often consists of multiple features (also called attributes). For example, ML models trained by banks for loan decisions may rely on features such as the applicant's age, gender, salary, expenses, credit score and employment. ML models trained on datasets of personal and financial data can often become biased with respect to certain sensitive attributes such as gender, age etc. This may be the result of strong correlation of such sensitive attributes with other non-sensitive attributes such as salary and education. However, this correlation (or other sources of bias in the training datasets) may lead such models to discriminate (i.e., to exhibit bias in the model's inferences) against the interests of certain groups of people. For instance, if a model trained on age and salary data for individuals recommends granting loans to 70% of the applicants with ages from 40-50 but only 40% of the applicants with ages from 30-40, the model is said to discriminate based on the "age" feature; specifically, the model discriminates against age group 30-40. This discrimination may not comply with fairness standards of the bank, and it is therefore critical to identify the risk of such discrimination in advance before the model is deployed.

Moreover, the size of the group that is discriminated against (e.g., loan applicants of age 30-40) is also important: if the size of group is large, this indicates that a larger number of customers suffers from discrimination. Businesses are often interested in identifying large groups that are discriminated against, in order to maximize customer satisfaction among their customer base. Not only is identifying discrimination useful for entities that use ML models to make important decisions, it is also useful for cloud computing service providers that provide ML models as a service to their clients. In this case, the provider might want to make sure that the models provided to clients are fair with respect to the attributes that are deemed sensitive by the client. If any discrimination exists, the client should be aware of it before the model is deployed in a commercial or other public capacity.

Some examples described herein may provide vertical federated learning techniques for training a fair machine learning model. Specifically, the model may achieve a degree of fairness defined by fairness threshold $\delta$ (also referred to as achieving $\varepsilon$-fairness, or being a $\varepsilon$-fair model) by solving the following optimization problem:

$$\min_{\theta} L(\theta) \qquad \text{(Equation 1)}$$

$$\text{such that } \left| \hat{l}^a(\theta) - \hat{l}^b(\theta) \right| \le \varepsilon$$

wherein the objective function $L(\theta)$ is the machine learning loss function, $\hat{l}^a(\theta)$ is the loss over the set of data samples having a first value a (e.g., "30-40") for a protected class (e.g., protected class "age"), $\hat{l}^b(\theta)$ is the loss over the set of data samples having a second value b (e.g., "40-50") for the protected class, and the constraint $$\left| \hat{l}^a(\theta) - \hat{l}^b(\theta) \right| \le \varepsilon \qquad \text{(Equation 2)}$$

enforces the model to be $\varepsilon$-fair with respect to the two values of the protected class. The fairness threshold $\varepsilon$ therefore defines the maximum degree of tolerable unfairness and, the measure of unfairness $|\hat{l}^a(\theta) - \hat{l}^b(\theta)|$ may be referred to herein as a difference in equal opportunity (DEO) measure or an unfairness measure. More precisely, the DEO may be defined as follows: Let $$\hat{l}^s(\theta) = \frac{1}{|N^s|} \sum_{i \in N^s} l(X_i^T \theta, y_i)$$

where $N^s$ I the set of indexes in which the samples belong to the protected class $s \in \{a, b\}$ and have a positive label. The DEO of the model is captured by the absolute difference between $\hat{l}^a(\theta)$ and $\hat{l}^b(\theta)$, i.e., $|\hat{l}^a(\theta) - \hat{l}^b(\theta)|$. Thus, in examples having multiple protected classes, multiple DEOs are separately computed. The gradients of these DEOs are also computed separately, as described below. Each DEO represents a separate constraint, associated with its own dual variable $\lambda$ as described below.

In some examples, a dual variable $\lambda$ is used in transforming the optimization problem above into a min-max problem using Lagrangian relaxation. The min-max problem can then be solved using a gradient coordinate descent-ascent algorithm.

The Lagrangian relaxation operation is as follows. Define $D(\theta) := l^a(\theta) - l^b(\theta)$. The fairness constraint in the fair vertical federated learning problem can be rewritten as:

$$D(\theta) - \varepsilon \leq 0 \qquad \text{(Equation 3)}$$

$$-D(\theta) - \varepsilon \leq 0$$

wherein

The Lagrangian of the constrained problem can be considered as:

$$f(\theta, \lambda) = L(\theta) + \lambda_1(D(\theta) - \varepsilon) - \lambda_2(D(\theta) + \varepsilon) \qquad \text{(Equation 4)}$$

where $\lambda = [\lambda_1 \geq 0; \lambda_2 \geq 0]$ is a dual variable associated with the inequality constraints. Given a general nonlinear loss function l, the Lagrangian is nonconvex with respect to $\theta$ and concave with respect to $\lambda$. Thus, the optimization problem described above can be equivalently transformed to a min-max optimization problem:

$$\min_{\theta} \max_{\lambda \in \mathbb{R}_+^2} f(\theta, \lambda) \qquad \text{(Equation 5)}$$

In some examples, the min-max optimization problem is solved by an asynchronous gradient coordinate-descent ascent algorithm. This algorithm uses a regularized version of f, i.e.:

$$\tilde{f}_t(\theta, \lambda) = f(\theta, \lambda) - \frac{c_t}{2}\|\lambda\|^2 \qquad \text{(Equation 6)}$$

wherein $\tilde{f}_t(\theta, \lambda)$ denotes the strongly-concaved Lagrangian, and $c_t$ denotes the strongly-concaved modulus. Using the regularized version of f speeds up the convergence of the algorithm, wherein the regularization term $$\frac{c_t}{2}\|\lambda\|^2$$

with monotonically decreasing nonnegative parameter $\{c_t\}_{t \geq 0}$ renders $\tilde{f}_t$ strongly concave with respect to $\lambda$ with modulus $c_t$. The partial gradients of $\tilde{f}_t$ with respect to $\lambda_1$, $\lambda_2$ and $\theta_k$, k=1, . . . , K are derived as:

$$\nabla_{\lambda_1} \tilde{f}_t(\theta, \lambda) = -c_t\lambda_1 + D(\theta) - \varepsilon \qquad \text{(Equation 7)}$$

$$\nabla_{\lambda_2} \tilde{f}_t(\theta, \lambda) = -c_t\lambda_2 - D(\theta) - \varepsilon$$

and $$\nabla_k \tilde{f}_t(\theta, \lambda) = \nabla_k L(\theta) + (\lambda_1 - \lambda_2)\nabla_k D(\theta) \qquad \text{(Equation 8)}$$

respectively.

To solve the min-max optimization problem in a distributed manner, each data owner k must update its local model learnable parameters 137, $\theta_k$, and the server 110 must update $\lambda$. Notably, computing the partial gradients of Equations 7 and 8 requires full information about the learnable parameter values 137, $\theta$, of the local model 136 with respect to which the gradients are being computed. To facilitate local updates, each data owner sends $$\{(X_i)_k^T \theta_k^{(t)}\}_{i=1}^n$$

to the server 110 at each time t, and the server 110 then calculates $$\{X_i^T \theta^{(t)}\}_{i=1}^n$$

and Equation 7 above. Based on these calculated values, the server 110 performs one projected gradient ascent step to update $\lambda$ by $$\lambda^{(t)} = \left[\lambda^{(t-1)} + \beta\nabla_\lambda \tilde{f}_{t-1}(\theta^{(t)}, \lambda^{(t-1)})\right]_+ \qquad \text{(Equation 9)}$$

wherein $[.]_+$ represents the projection onto the nonnegative orthant. Then, the server 110 sends $\lambda^{(t)}$ and $$\{X_i^T \theta^{(t)}\}_{i=1}^n$$

back to the data owners. With this information, each data owner k is able to compute Equation 8, followed by one gradient descent step to update $\theta_k$:

$$\theta_k^{(t+1)} = \theta_k^{(t)} - \frac{1}{\eta_t}\nabla_k \tilde{f}_t(\theta^{(t)}, \lambda^{(t)}) \qquad \text{(Equation 10)}$$

The updates in Equations 9 and 10 are performed in an alternating manner, implying that between every two communication rounds each data owner updates its local learned parameters 137 once. In real-world vertical federated learning tasks, different data owners typically have imbalanced computational resources and complete their local updates within different time frames. Thus, in some examples, enforcing all the data owners to launch a single local update between two consecutive communication rounds may result in inefficiency. Therefore, it may be desirable to enable multiple local updates in parallel when solving the fair vertical federated learning task.

Accordingly, some embodiments described herein may use an asynchronous gradient coordinate-descent ascent algorithm that enables each data owner k to perform multiple local gradient updates in parallel before exchanging information with the server 110. As described above, at each time t, each data owner calculates the term $\nabla_k \tilde{f}_t(\theta, \lambda)$ in Equation 8 based on the information $$\{X_i^T \theta^{(t)}\}_{i=1}^n$$

15 from the server 110. When allowing multiple local updates in parallel, each data owner has inconsistent read of the actual model learnable parameters (i.e., the current on-the-fly state of global model 126 before being stored on the server 110). Between two consecutive communication rounds at t and t+1, $\theta^{(t,\tau)}$ is defined as the actual model learnable parameters (i.e., on-the-fly state of global model 126) wherein $\theta^{(t,0)}=\theta^{(t)}$. Let $\psi(t,\tau)$ be the index of the data owner that performs an update at $(t,\tau)$. The local inconsistent read of $\theta^{(t,\tau)}$ by party $\psi(t,\tau)$ is written as:

$$\tilde{\theta}^{(t,\tau)} = \left[\theta_1^{(t)}; \ldots; \theta_{\psi(t,\tau)-1}^{(t)}; \theta_{\psi(t,\tau)}^{(t,\tau)}; \theta_{\psi(t,\tau)+1}^{(t)}; \ldots; \theta_K^{(t,\tau)}\right].$$

Based on this labeling strategy, the local updates of the data parties can be summarized as:

$$\theta^{(t,\tau+1)} = \theta^{(t,\tau)} - \frac{1}{\eta_t} U_{\psi(t,\tau)} \tilde{g}^{(t,\tau)} \qquad \text{(Equation 11)}$$

wherein $U_{\psi(t,\tau)} \in \mathbb{R}^{m \times m_i}$, $[U_1, \ldots, U_q] = I_m$ and $$\tilde{g}^{(t,\tau)} = \nabla \tilde{f}_t\left(\tilde{\theta}^{(t,\tau)}, \lambda^{(t)}\right).$$

It will be appreciated that the direction $\tilde{f}^{(t,\tau)}$ contains stale information about $\theta^{(t,\tau)}$ and serves as an approximation of the actual partial gradient. Let $\varkappa(t)$ represent the number of updating times, and $\theta^{(t+1)}=\theta^{(t,\varkappa(t))}$. After receiving $$\left\{X_i^T \theta^{(t+1)}\right\}_{i=1}^n$$

from all the data owners, the server 110 updates $\lambda^{(t+1)}$ using Equation 9.

The algorithms for the data owners (controlling the computing systems 102) and the server 110 are summarized in Algorithms 1 and 2, respectively, below:

---

Algorithm 1: Fair VFL for data owner k
(performed by computing system 102)

---

Input: Local data $\{(X_i)_k, y_i, s_i\}_{i=1}^n$ stored on the $k$-th party, step size $\{\eta_t\}_{t\geq 0}$.
Initialize: Set $\theta^{(0)} = 0$, $\lambda^{(0)} = 0$.
1:     for t = 0, 1, 2, . . . do
2:          In parallel for each party k
3:          while no new information from Server do
4:               Compute $\left\{X_i^T \tilde{\theta}\right\}_{i=1}^n$.
5:               Compute $\nabla_k f_t(\tilde{\theta}, \lambda)$
6:               Update $\theta_k \leftarrow \theta_k - \eta_t^{-1} \nabla_k \tilde{f}_t(\tilde{\theta}, \lambda)$.
7:               Send $\left\{(X_i)_k^T \theta_k\right\}_{i=1}^n$ to Server.
8:          end while
9:          Receive $\left\{X_i^T \theta\right\}_{i=1}^n$ and $\lambda$ from Server.
10:    end for

---

16

---

Algorithm 2: Fair VFL for server
(performed by server 110)

---

Input: Labels and protected classes $\{y_i, s_i\}_{i=1}^n$, unfairness tolerance $\varepsilon$, parameter $\{c_t\}_{t\geq 0}$, step size $\{\eta_t\}_{t\geq 0}$ and $\beta$.
Initialize: Set $\lambda^{(0)} = 0$.
1:     for t = 1,2 . . . do
2:          Compute $\nabla_\lambda \tilde{f}_t(\theta, \lambda)$ using (7).
3:          Update $\lambda \leftarrow [\lambda + \beta \nabla_\lambda \tilde{f}_{t-1}(\theta, \lambda)]$.
4:          Receive $\{(X_i)_k^t \theta_k\}_{i=1}^n$ from each party $k$.
5:          Send $\left\{X_i^T \theta\right\}_{i=1}^n$ and $\lambda$ to all the parties.
6:     end for

---

In some examples, the following assumption is made for the number of local iteration rounds: Between two consecutive communication rounds with the server 110, each data owner (i.e. each computing system 102) performs an update at least once and at most Q≥1 times. Such an assumption is standard in federated learning.

Thus, in some examples, the present disclosure provides a fair and secure vertical federated learning (FSVFL) system 300 for training a ε-fair model.

Figure 3:
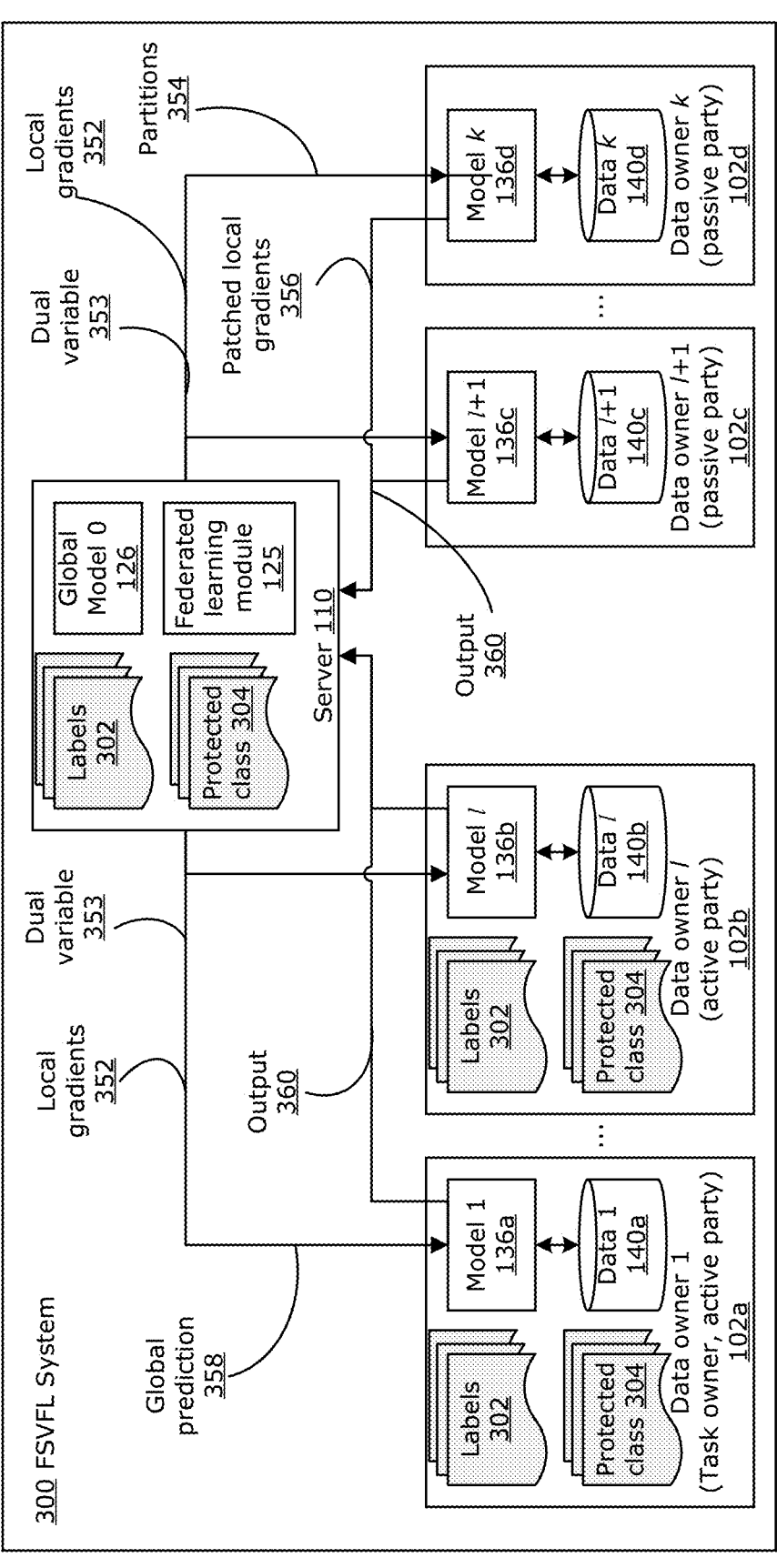
FIG. 3 is a block diagram of an example of a fair and secure vertical federated learning (FSVFL) system according to an embodiment of the present disclosure.

FIG. 3 shows a block diagram of an example FSVFL system 300 for securely training a ε-fair model. Components in the FSVFL system 300 which are similar to the components in the system 100 are indicated using the same reference numeral. The FSVFL system 300 includes computing systems 102 of k data owners (shown as 102*a*, 102*b*, 102*c*, and 102*c*) and a server 110 which communicates with the computing systems 102 of the k data owners. Each computing system 102 of a data owner stores a private local dataset 140 of the data owner (shown as 140*a*, 140*b*, 140*c*, and 140*c*). The local datasets 140 stored by the computing systems 102 of the data owners are vertically partitioned, at least in part. Each computing system 102 of a data owner privately stores a private local model 136 (shown as 136*a*, 136*b*, 136*c*, and 136*c*) that can fully access the private local dataset 140 of the data owner. The computing systems 102 of all k data owners use their private local datasets 140 and private local models 136 to collaborate in the FSVFL system 300, and their goal is to achieve a trained model for a machine learning task T (hereinafter referred to as task T). This learning is coordinated using the server 110, which uses the federated learning module 125 and global model 126 to perform, in part, the methods described herein.

The FSVFL system 300 designates one of the data owners as the task owner. A task owner is a special data owner that initializes and privately owns the task T for which the local models 136 and global model 126 (or, at minimum, task owner local model 136*a*) are to be trained. A model being trained using the techniques described herein may be referred to as a primary model or a primary machine learning model. The computing system 102*a* of the task owner privately stores labels related to the task T, and the task owner privately defines a loss function or other objective function with respect to task T. For example, data owner 1 in FIG. 3 is the task owner for a task T. In various examples, a computing system 102 of a data owner can initiate training of one or more local models 136 to perform as many tasks as the data owner needs; however, there is a single task owner for any given task.

The FSVFL system 300 includes, among its data owners, one or more active parties, shown as a number, l, of active parties: data owner 1 i.e. the task owner (controlling computing system 102a) through data owner 1 (controlling computing system 102b). An active party is a special data owner trusted by the task owner. The computing system 102 of an active party (i.e., 102a through 102b) stores the labels 302 and the protected class information 304 related to the task T and knows the loss function defined by task owner. In various embodiments, the labels 302, the protected class information 304, and the loss function definition may be encoded in various forms consistent with known techniques for federated learning. The protected class information 304 identifies one or more classes that are to be considered protected classes in accordance with the techniques described herein. The computing system 102 of an active party can calculate both the loss function with respect to the task T, and the fairness, locally. The task owner is always an active party.

The FSVFL system 300 also includes, among its data owners, one or more passive parties, shown as a number, (k-l), of active parties: data owner l+1 (controlling computing system 102c) through data owner k (controlling computing system 102d). A passive party is a data owner whose computing system 102 does not store the labels 302 or the protected class information 304 for the task T. The computing system 102 of a passive party (e.g., 102c or 102d) cannot calculate the loss function with respect to the task T or the fairness locally. The task owner cannot be an active party.

The computing system 102a of the task owner may be referred to herein as the "task owner computing system"; a computing system 102 of an active party (e.g., 102a or 102b) may be referred to herein as an "active computing system"; and a computing system 102 of a passive party (e.g., 102c or 102d) may be referred to herein as a "passive computing system".

The FSVFL system 300 also includes a server 110. The server 110 privately stores a global model 126 that generates a final prediction for the task T. The server 110 is trusted by the task owner, and the server 110 receives and stores the labels 302 and protected class information 304 from the computing system 102a of the task owner. The duty of the server 110 is to coordinate the training of the FSVFL system 300 and provide some necessary information to the computing systems 102 of the passive parties.

Thus, the FSVFL system 300 allows a task owner controlling a computing system 102a to train a local model 136a to perform a task T, using federated learning to draw on the data controlled by one or more trusted data owners (i.e. the other active parties) and one or more non-trusted data owners (i.e. the passive parties), coordinated using a trusted server 110. None of the parties has access to the local datasets 140 of the other parties, and only the task owner and the trusted parties (i.e. server 110 and other active parties) have access to the loss function, the labels 302, and the protected class information 304.

As shown in FIG. 3, there are no connections or communications between the computing systems 102 of the data owners. The communications are only between the computing systems 102 of the data owners and the server 110. Specifically:

The computing system 102a through 102d of each data owner sends its output 360 (i.e., the inference output of each local model 136a through 136d) to the server 110.

The server 110 sends the local gradients 352 for each local model output 360, the global prediction 358 of the global model 126, and the dual variable λ 353 associated with the DEO fairness constraint (described above), to the computing systems 102a through 102b of the task owner and the other active parties.

The server 110 sends the local gradients 352 for each local model output 360, the dual variable λ 353, and partitions 354 (see below) to the computing systems 102c through 102d of each data owner who is a passive party.

The computing systems 102c through 102d of each data owner who is a passive party sends its patched local gradients 356 (see below) based on the partitions 354 sent by the server 110.

The notations used in the FSVFL system 300 for training are defined as follows:

$X_j$, $j \in \{1, \ldots, k\}$ is a set of training data of the data owner j.

If full-batch training is performed, $X_j$ is the set of all training data (i.e., the local dataset 140) held by the data owner j.

If stochastic training methods are applied, $X_j$ can be a set of randomly sampled training data from the local dataset 140 stored in the computing system 102 of the data owner j.

All the samples in $X_1, \ldots, X_k$ are aligned by unique sample IDs. I.e., a given data sample 224 may appear in two parties' local datasets 140, with distinct sets of associated features 222 in each such local dataset 140, but having a common sample ID.

$$X_j^{p,s}, \; j \in \{1, \ldots, k\}$$

is the set of positively labelled training data belonging to class s of the data owner j. E.g., if each data sample in a local dataset 140 corresponds to an individual customer, then each such data sample having a value for an "age" feature falling within class "30-40" would be a positively labelled training data sample with respect to class s wherein s denotes age value 30-40.

$P_1, \ldots, P_N$ are random partitions 354 of positively labeled samples, wherein the samples in each partition belong to the same protected class (e.g., age 30-40). By generating random partitions 354 and communicating these partitions 354 to the computing systems 102c through 102d controlled by the passive parties, the federated learning module 125 of the server 110 renders recovery of the protected class information by the passive parties NP-hard. A set of partitions 354 $P_1, \ldots, P_N$ may be referred to herein as partition data. The random partitions 354 may be generated by randomly grouping a subset of the positively labelled samples.

$\theta_j$, $j \in \{1, \ldots, k\}$ is the set of model parameters for the local model 136 of data owner j (i.e. model j): i.e., $\theta_1$ is local model 136a, $\theta_l$ is local model 136b, $\theta_{l+1}$ is local model 136c, and $\theta_k$ is local model 136d.

$f_j(X_j|\theta_j)$, $j \in \{1, \ldots, k\}$ is the local model 136 of the data owner j.

$o_j = f_j(X_j|\theta_j)$, $j \in \{1, \ldots, k\}$ is the output 360 of local model j with respect to training dataset $X_j$, i.e. local dataset 140. The dimension of $o_j$ can be 1 or larger. It will be appreciated that, because each local dataset 140 may include a different subset of data samples 224 (identified by unique sample IDs), each output $o_j$ will only pertain to the data samples 224 included in the local dataset 140 of data owner j, i.e. training dataset $X_j$.

$\theta_0$ is the set of learnable parameters for the global model 126 (i.e. model 0) of the server 110.

19

$f_0(o_1, \ldots, o_k|\theta_0)$ is the global model 126 (i.e. model 0) of the server 110.

$o_0 = f(o_1, \ldots, o_k|\theta_0)$ is the output of model 0 (i.e. global model 126 on server 110) with respect to the set of outputs 360 $o_1, \ldots, o_k$. Here, $o_0$ also represents the global prediction 358 generated by the global model 126 of the server 110 of the FSVFL system 300. It will be appreciated that, because each output $o_j$ pertains to the data samples 224 included in the local dataset 140 of data owner j, i.e. training dataset $X_j$, this means that the global model 126 generates its output $o_0$ (i.e. global prediction 358) with respect to all data samples 224 that are the subject of predictions of any of the outputs 360 $o_1, \ldots, o_k$. Thus, global prediction 358 includes prediction outputs for all data samples 224 included in any of the local datasets 140, including the data samples 224 of the vertically partitioned data 230.

A loss is calculated by the server 100 based on global model output $o_0$ (i.e. global prediction 358) and labels 302, based on an objective function defined by the task owner controlling computing system 102a.

DEO denotes a fairness constraint function characterized by the difference of equal opportunities (DEO).

The gradient of global model 126 output $o_0$ (i.e. of global prediction 358) is denoted as $$\frac{\partial \text{Loss}}{\partial o_0}, \frac{\partial DEO}{\partial o_0},$$

i.e., the gradient is computed with respect to both the loss and the fairness constraint function (DEO).

The patched local gradient 356 computed by a computing system 102 of a passive party j is denoted:

$$\sum_{s \in P_i} \frac{\partial \text{Loss}}{\partial o_j} \frac{\partial o_j}{\partial X_j^{p,s}}, i = 1, \ldots, N \qquad \text{(Equation 12)}$$

$\lambda$ is the dual variable associated with the DEO fairness constraint as described above.

The training performed by the FSVFL system 300 will now be described with reference to FIG. 4.

Figure 4:
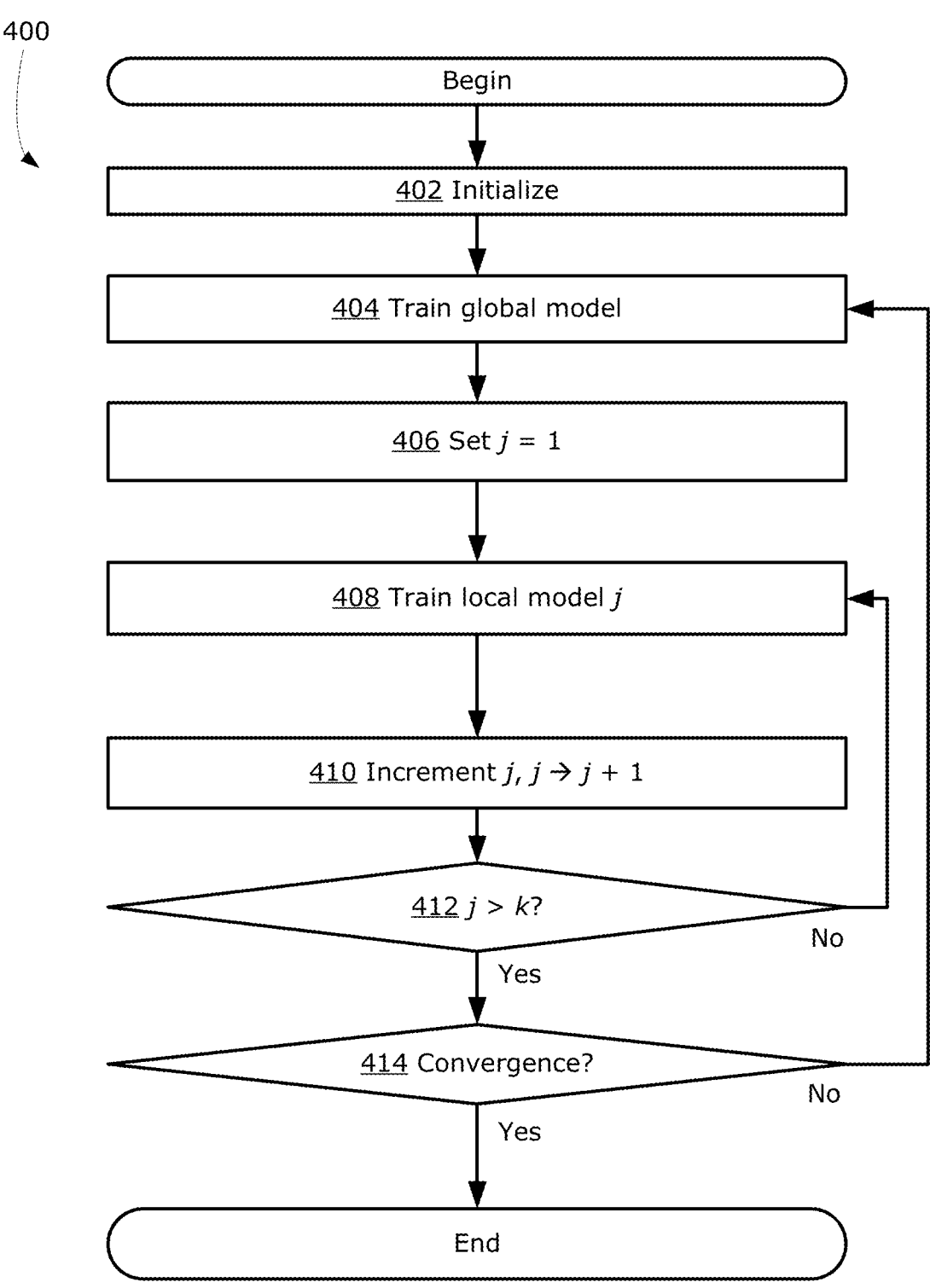
FIG. 4 is a flowchart of a method for training performed by the FSVFL system of FIG. 3.

FIG. 4 is a flowchart showing operations of an example method 400 for training a model using fair and secure vertical federated learning. Whereas the operations of method 400 make reference to the FSVFL system 300, it will be appreciated that the method 400 could be performed by other systems in some embodiments. In the described example, the operations performed by the server 110 are performed by the federated learning module 125, and the operations of each computing system 102 are performed by the instructions 139, each using the available model(s) and data as applicable to perform the operations. It will be appreciated that, in some embodiments, some of the steps of method 400 shown in FIG. 4 may be performed in parallel, and their sub-steps as described below may include overlapping operations: for example, the training of the global model at 404 may be performed in parallel with training of each local model at 408, wherein each global model and local model is trained during each round of mutual communication. Thus, the sub-steps of 404 and each iteration of 408 described below may refer to the same sub-steps performed in each of the other training steps for other models (i.e., 404 or another iteration of 408). This parallel operation of method 400 is equally applicable to methods 650 and 750 described below in some embodiments.

The method 400 begins with step 402. At 402, an initialization operation is performed. The server 110 collects anonymized data sample IDs from the data samples of local datasets 140 of the computing systems 102 of all data owners and uses the data sample IDs to align the data samples from all training datasets $X_1, \ldots, X_k$. The computing system 102a of data owner 1 becomes a task owner and an active party by initiating a task T. The task owner computing system 102a sends labels 302, the loss function definition, and the protected class information 304 to the server 110 and the trusted data owners (i.e., the computing systems 102 controlled by other active parties, such as 102b). The computing system 102a of the task owner randomly initializes the learnable parameters 137 (i.e. $\theta_1$) of its local model 136a, and sends a task initiation request and the fairness constraint threshold (hyperparameter $\varepsilon$) to the server 110.

Based on the task initiation request received from the computing system 102a of the task owner, the server 110 broadcasts the task initiation request to the computing systems 102 of the other data owners 2 through k (including 102b, 102c, and 102d).

Based on the task initiation request received from the server 110, the computing systems 102 of the data owners 2 through k randomly initialize the learnable parameters 137 of their own local models 136. The computing systems 102 of trusted data owners, who receive the labels 302 and protected class information 304, become active parties (such as 102b). The computing systems 102 of the other data owners (i.e. 102c through 102d) become passive parties.

At 404, the global model 126 is trained. The computing systems 102 of all data owners 1 through k compute their model outputs 360, $o_1, \ldots, o_k$, based on their respective local datasets 140, and send the outputs 360 to the server 110. Based on the outputs 360 received from the computing systems 102 of the data owners 1 through k, the server 110 computes its global prediction 358, $o_0 = f_0(o_1, \ldots, o_k|\theta_0)$ (i.e. the output of the global model 126), and uses its global prediction 358 (i.e. predicted labels) to compute:

The loss related to the task T, using the labels 302;

The DEO (i.e. $|\hat{I}^a(\theta) - \hat{I}^b(\theta)|$) for each pair of protected classes a and b relative to each other, using the protected class information 304;

The global gradients of the global model 126:

$$\frac{\partial \text{Loss}}{\partial \theta_0}, \frac{\partial DEO}{\partial \theta_0},$$

based on the computed loss and DEO; and

The local gradients 352 of each local model output 360, e.g. model j:

$$\frac{\partial \text{Loss}}{\partial o_j}, \frac{\partial DEO}{\partial o_j}.$$

Based on the global gradients $$\left( \text{i.e.} \frac{\partial \text{Loss}}{\partial \theta_0}, \frac{\partial DEO}{\partial \theta_0} \right),$$

the server 110 updates the learnable parameters 127 of its global model 126 (i.e. $\theta_0$).

Based on the calculated DEO (i.e. $|\hat{l}^a(\theta)-\hat{l}^b(\theta)|$) for a given fairness constraint, the server 110 updates the variable $\lambda$ associated with the constraint. The server 110 then broadcasts $\lambda$ and respective local gradients 352

$$\frac{\partial \text{Loss}}{\partial o_j}, \frac{\partial DEO}{\partial o_j}$$

to the computing system 102 of each data owner j.

A gradient of the loss, such as $$\frac{\partial \text{Loss}}{\partial \theta_0} \text{or} \frac{\partial \text{Loss}}{\partial o_j},$$

may be referred to herein as a loss gradient. A gradient of the DEO, such as $$\frac{\partial DEO}{\partial \theta_0} \text{or} \frac{\partial DEO}{\partial o_j},$$

may be referred to herein as a DEO gradient or an unfairness gradient. It will be appreciated that the global gradients of the global model 126, as well as local gradients 352, may include both a loss gradient and a DEO gradient.

The server 110 generates random partitions 354 identifying subsets of positively labeled samples $P_1, \ldots, P_N$ and sends the partitions 354 to the computing systems 102c through 102d of the passive parties.

Each computing system 102c through 102d of a passive party then computes its patched local gradients 356 based on the partitions 354 and the DEO gradient of the local gradients 352:

$$\sum_{s \in P_i} \frac{\partial DEO}{o_j} \frac{\partial o_j}{X_j^{p,s}}, i = 1, \ldots, N$$

The patched local gradients 356 are sent to the server 110 from the computing system 102 of each passive party j. The server 110 then computes and sends a further local gradient 352

$$\frac{\partial DEO}{\partial \theta_j}$$

to the computing system 102 of the passive party j.

As shown in FIG. 4, step 404 is iterated until a convergence condition is satisfied at step 414.

At 406, the first computing system 102a is identified by setting j=1.

At 408, local model j (i.e., in the first iteration of 408, local model 136a) is trained. The computing systems 102 of all data owners 1 through k compute their model outputs 360, $o_1, \ldots, o_k$, and send the model outputs 360 to the server 110. Based on the local gradients 352, $$\frac{\partial \text{Loss}}{\partial o_j}, \frac{\partial DEO}{\partial o_j},$$

received from the server 110, the computing system 102 of active party j computes $$\frac{\partial \text{Loss}}{\partial \theta_j}, \frac{\partial DEO}{\partial \theta_j}$$

and updates its iocai model parameters 137, $\theta_j$.

Operation 408 proceeds differently once j is incremented to a value indicating a passive party, i.e. when j≥1. As with an active data owner, first, the computing systems 102 of all data owners 1 through k compute their model outputs 360, $o_1, \ldots, o_k$, and send model outputs 360 to the server 110. Second, based on the local gradient 352, $$\frac{\partial \text{Loss}}{\partial o_j},$$

received from the server 110, the computing system 102 of passive party j computes $$\frac{\partial \text{Loss}}{\partial \theta_j}.$$

Third, based on the gradient $$\frac{\partial DEO}{\partial o_j}$$

and the partitions 354 received from the server 110, $P_1, \ldots, P_N$, the computing system 102 of the passive party j computes its patched local gradients 356:

$$\sum_{s \in P_i} \frac{\partial DEO}{o_j} \frac{\partial o_j}{X_j^{p,s}}, i = 1, \ldots, N$$

and sends the patched local gradients 356 to the server 110. Fourth, based on the gradient 352, $$\frac{\partial DEO}{\partial \theta_j},$$

from the server 110, the passive party j updates its local learnable parameters 137 (i.e. $\theta_j$).

As shown in FIG. 4, step 408 is iterated for each data owner (i.e. until j>k at step 412). At 410, the value of j is incremented (j→j+1), and at 412, if j>k, then the method advances to operation 414, otherwise the method 400 returns to operation 408. These k iterations of operation 408 are repeated again after each iteration of operation 404.

In some embodiments, the operations of method 400 are performed in accordance with the algorithms described above with reference to solving the optimization problem of Equation 1.

Thus, in at least some embodiments, the present disclosure may provide techniques for performing fair, secure, vertical federated learning that overcomes one or more of the technical problems identified above. Specifically:

MODEL FAIRNESS: Due to the fairness constraint used in training, examples described herein can guarantee that any DEO of the trained model falls below the fairness threshold ε.

HIGH SECURITY: The data of the data owners is never transmitted from the computing system 102 of a data owner. Furthermore, a data owner never transmits any information about the learnable parameter values 137 of its local model 136.

HIGH ACCURACY: No approximation is used, resulting in high accuracy in trained model predictions.

HIGH EFFICIENCY: No encryption is used to protect data privacy, and all computations are carried out with plain text (i.e., unencrypted data).

HIGH GENERALITY: The relatively simple systems and protocols used are compatible with a wide variety of machine learning model types.

Figure 5:
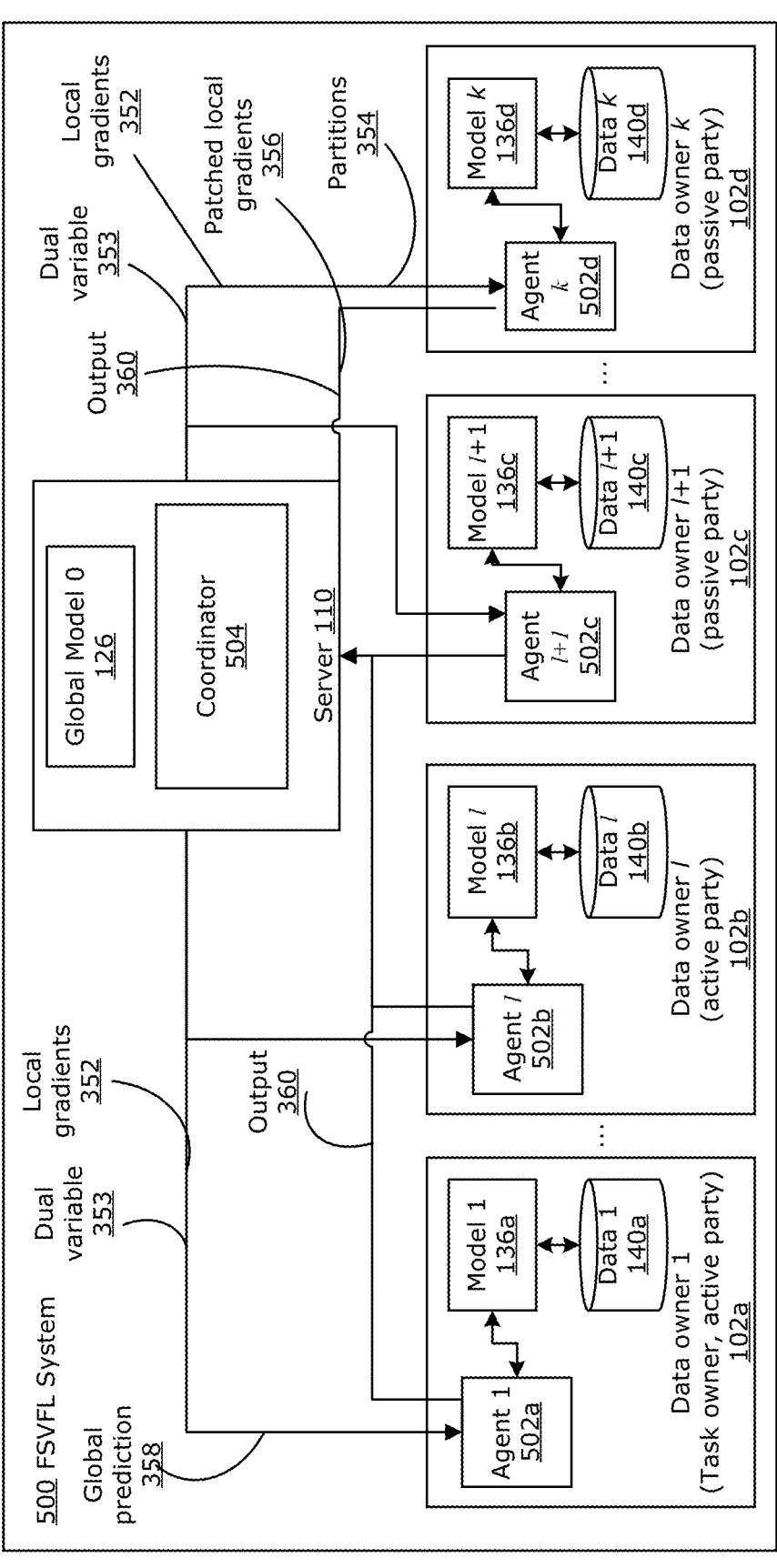
FIG. 5 is a block diagram of another example of a FSVFL system according to an embodiment of the present disclosure.

FIG. 5 shows a block diagram of another example embodiment of a FSVFL system 500. In some examples, the FSVFL system 500 operates identically to the FSVFL system 300 of FIG. 3, i.e. according to method 400. Components in the FSVFL system 500 which are similar to the components in the systems 100, 300 are indicated using the same reference numeral. In the FSVFL system 500 shown in FIG. 5, the computing system 102 of each data owner includes an agent 502 (shown as 502a-d), and the server 110 includes a coordinator 504. In some examples, the operations of the coordinator 504 and agents 502 are performed by the federated learning module 125 and instructions 139, respectively. An agent 502, agent i (i∈{1, . . . , k}), handles all communications between the computing system 102 of data owner i and the coordinator 504. The agent 502 ensures that no data or local model learnable parameters 137 of data owner i are transmitted from computing system 102 of the data owner i to the server 110. The coordinator 504 coordinates all communications between the computing systems 102 of the data owners 1, . . . , k and the server 110. The coordinator 504 ensures that no learnable model parameters 127 of model 0 (i.e. global model 126) stored on the server 110 are transmitted from the server 110 to any computing system 102.

As long as the agents 502 1, . . . , k and the coordinator 504 make sure that no data or learnable model parameters 127 or 137 are transmitted between the computing systems 102 of the data owners and the server 110, then the FSVL system 500 guarantees the privacy of data owners' local datasets 140 and of each model 126, 136. Thus, in some embodiments, FSVL system 30 may eliminate the need for further procedures to protect privacy of local datasets 140 and models 126, 136 for servers 110 that are implemented as a hybrid cloud or a public cloud.

Figure 6A:
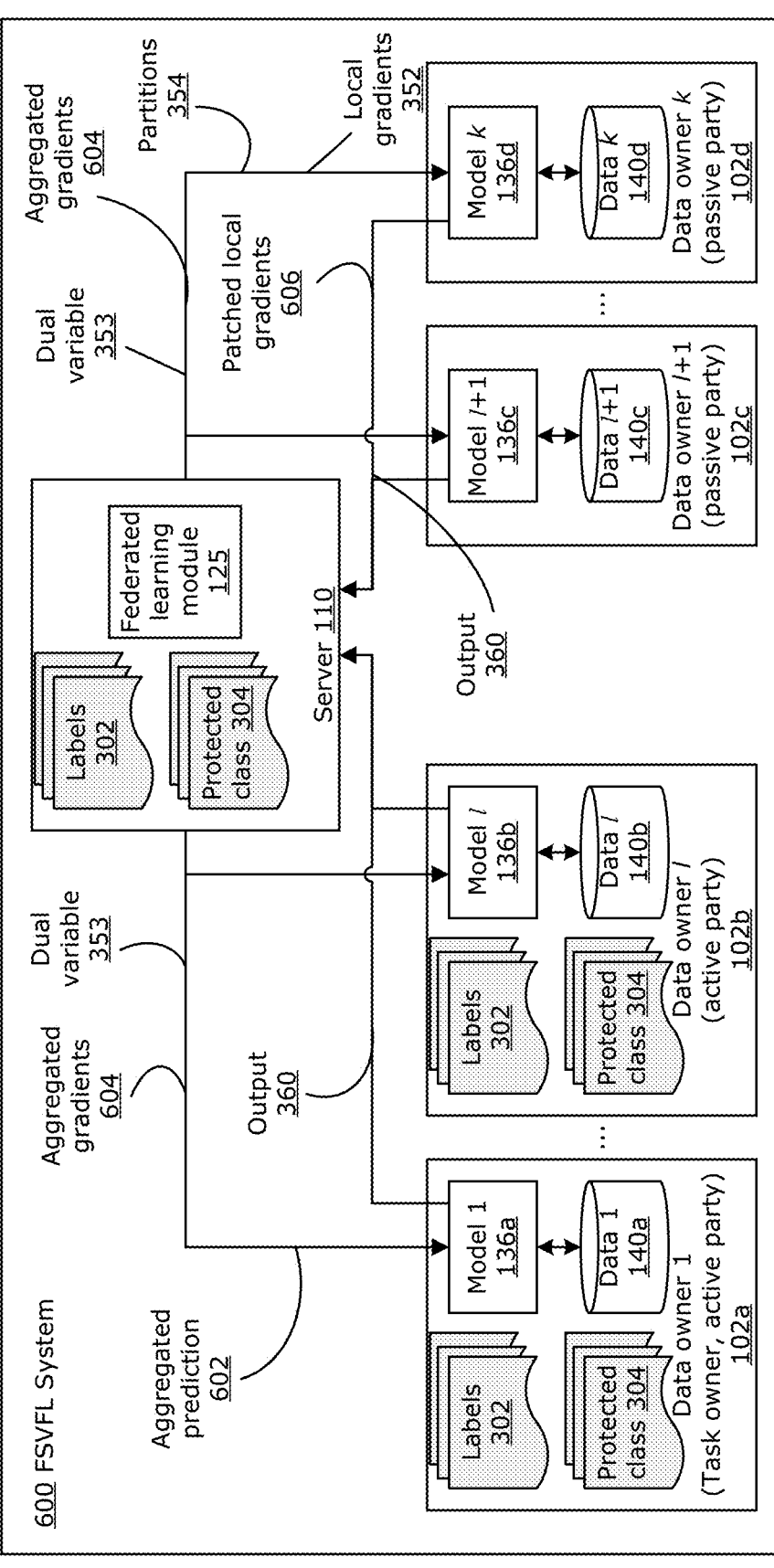
FIG. 6A is a block diagram of another example of a FSVFL system according to an embodiment of the present disclosure.

FIG. 6A shows another example embodiment of a FSVFL system 600 is shown. Components in the FSVFL system 600 which are similar to the components in the systems 100, 300, 500 are indicated using the same reference numeral. In the FSVFL system 600, the server 110 does not store a global model 126. Instead, the federated learning module 125 executed by the server 110 aggregates the predictions of the local models 136 and propagates an aggregated prediction 658 to the computing systems 102. The training performed by the FSVFL system 600 will now be described with reference to FIG. 6B.

Figure 6B:
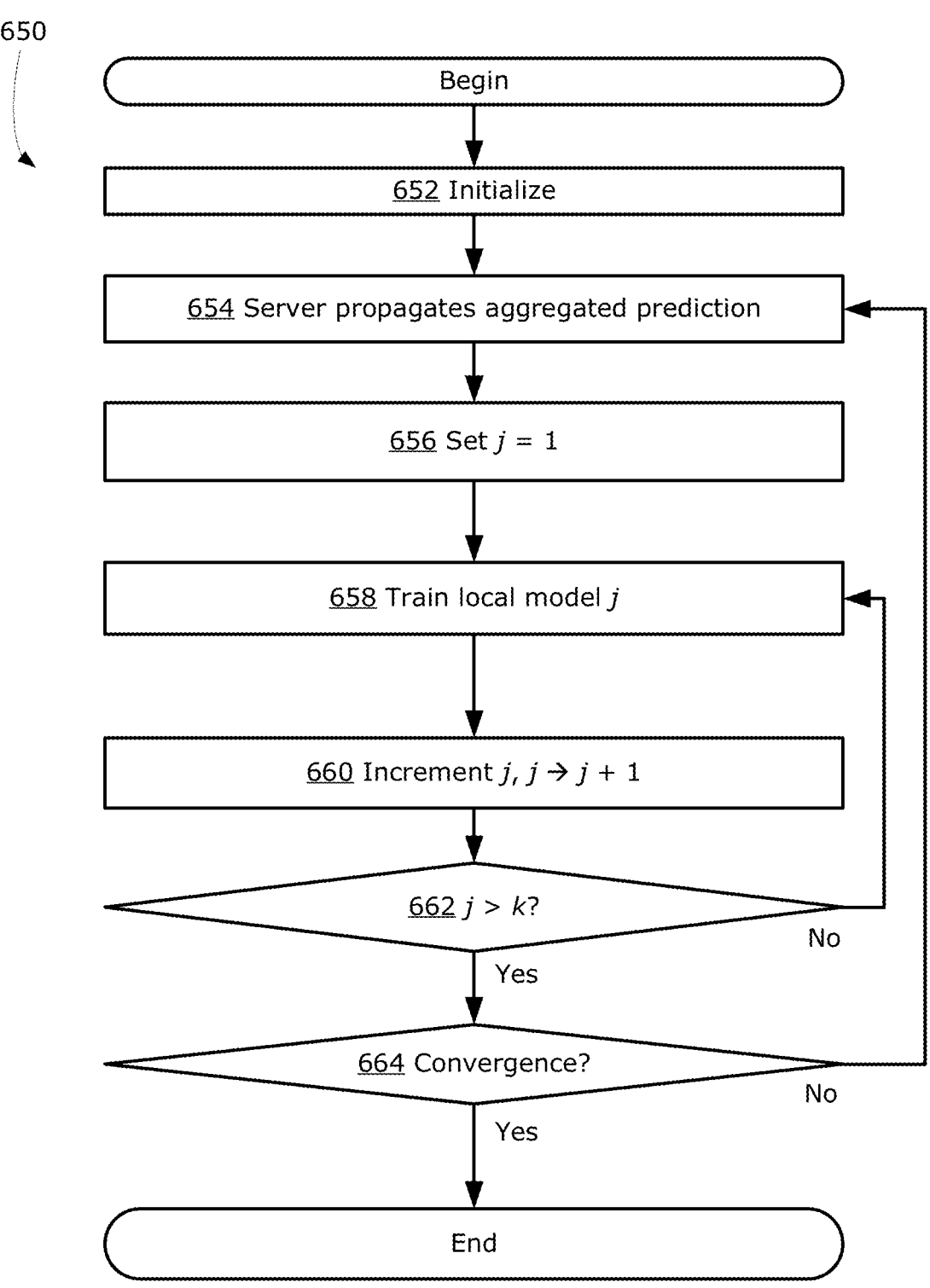
FIG. 6B is a flowchart of a method for training performed by the FSVFL system of FIG. 6A.

FIG. 6B is a flowchart showing operations of an example method 650 for training a model using fair and secure vertical federated learning, using the FSVFL system 600 of FIG. 6B. In the described example, the operations performed by the server 110 are performed by the federated learning module 125, and the operations of each computing system 102 are performed by the instructions 139, each using the available model(s) and data as applicable to perform the operations. Steps in the method 650 which are similar to the steps of method 400 are indicated using the same reference numeral.

The method 650 begins with step 652. At 652, as in step 402 of method 400, an initialization operation is performed. As in step 402, the server 110 collects anonymized data sample IDs from the data samples of local datasets 140 of the computing systems 102 of all data owners and uses the data sample IDs to align the data samples from all training datasets $X_1, \ldots, X_k$. The computing system 102a of data owner 1 becomes a task owner and an active party by initiating a task T. The task owner computing system 102a sends labels 302 and protected class information 304 to the server 110 and the trusted data owners (i.e., the computing systems 102 controlled by other active parties, such as 102b). The computing system 102a of the task owner randomly initializes the learnable parameters 137 (i.e. $\theta_1$) of its local model 136a, and sends a task initiation request and the fairness constraint threshold (hyperparameter ε) to the server 110.

Step 652 differs from step 402 in that, based on the task initiation request from the task owner, the server 110 only randomly initializes the dual variable λ; there are no global learnable model parameters 137 to initialize at step 652, because there is no global model 126.

The remainder of operation 652 proceeds as at step 402. The server 110 broadcasts the task initiation request to the computing systems 102 of the other data owners 2 through k (including 102b, 102c, and 102d).

Based on the task initiation request received from the server 110, the computing systems 102 of the data owners 2 through k randomly initialize the learnable parameters 137 of their own local models 136. The computing systems 102 of trusted data owners, who receive the labels 302 and protected class information 304, become active parties (such as 102b). The computing systems 102 of the other data owners (i.e. 102c through 102d) become passive parties.

At 654, the server 110 propagates the aggregated prediction 602. As in step 404 of method 400, the computing systems 102 of all data owners 1 through k compute their model outputs 360, $o_1, \ldots, o_k$, and send the outputs 360 to the server 110.

However, unlike step 404, at step 654 the server 110 computes the aggregated prediction 602 as the sum of the outputs 360:

$$o_0 = \sum\nolimits_{i=1}^{k} o_i.$$

The server 100 computes:
The loss related to the task T, using labels 302 (as at step 404);
Each DEO (i.e. $|\hat{l}^a(\theta) - \hat{l}^b(\theta)|$), using the protected class information 304 (as at step 404); and
The aggregated gradients 604 of the aggregated prediction 602, $$\frac{\partial Loss}{\partial o_0}, \frac{\partial DEO}{\partial o_0}$$

(different from step 404).

Based on each calculated DEO (i.e. $|\hat{l}^a(\theta) - \hat{l}^b(\theta)|$), the server 110 updates the corresponding $\lambda$. The server 110 then broadcasts each $\lambda$ and aggregated gradients 604

$$\frac{\partial Loss}{\partial o_0}, \frac{\partial DEO}{\partial o_0}$$

to the computing system 102 of each data owner j.

The server 110 generates random partitions 354 of positively labeled samples $P_1, \ldots, P_N$ and sends the partitions 354 to the computing systems 102c through 102d of the passive parties.

Each computing system 102c through 102d of a passive party then computes its patched local gradients 606:

$$\sum_{s \in P_i} \frac{\partial DEO}{o_0} \frac{\partial o_0}{X_j^{p,s}}, i = 1, \ldots, N$$

The patched local gradients 606 are sent to the server 110 from the computing system 102 of each passive party j. The server 110 then computes and sends a further local gradient 352

$$\frac{\partial DEO}{\partial \theta_j}$$

to the computing system 102 of the passive party j.

As shown in FIG. 6B, step 654 is iterated until a convergence condition is satisfied at step 664.

At 656, the first computing system 102a is identified by setting j=1.

At 658, as at step 408, local model j (i.e., in the first iteration of 658, local model 136a) is trained. The computing systems 102 of all data owners 1 through k compute their model outputs 360, $o_1, \ldots, o_k$, and send the model outputs 360 to the server 110. Based on the aggregated gradients 604

$$\frac{\partial Loss}{\partial o_0}, \frac{\partial DEO}{\partial o_0}$$

received from the server 110, the computing system 102 of active party j computes $$\frac{\partial Loss}{\partial \theta_j}, \frac{\partial DEO}{\partial \theta_j}$$

and updates its local model parameters 137, $\theta_j$.

As at step 408, operation 658 proceeds differently once j is incremented to a value indicating a passive party, i.e. when j≥1. As with an active data owner, first, the computing systems 102 of all data owners 1 through k compute their model outputs 360, $o_1, \ldots, o_k$, and send model outputs 360 to the server 110. Second, based on the aggregated gradient 604, $$\frac{\partial Loss}{\partial o_0},$$

received from the server 110, the computing system 102 of passive party j computes $$\frac{\partial Loss}{\partial \theta_j}.$$

Third, based on the aggregated gradient 604

$$\frac{\partial DEO}{\partial o_0}$$

and the partitions 354 received from the server 110, $P_1, \ldots, P_N$, the computing system 102 of the passive party j computes its patched local gradients 606:

$$\sum_{s \in P_i} \frac{\partial DEO}{o_0} \frac{\partial o_0}{X_j^{p,s}}, i = 1, \ldots, N$$

and sends the patched local gradients 606 to the server 110. Fourth, based on the local gradient 352, $$\frac{\partial DEO}{\partial \theta_j},$$

from the server 110, the passive party j updates its local learnable parameters 137 (i.e. $\theta_j$).

As shown in FIG. 6B, step 658 is iterated for each data owner (i.e. until j>k at step 662). At 660, the value of j is incremented (j→j+1), and at 662, if j>k, then the method advances to operation 664, otherwise the method 650 returns to operation 658. These k iterations of operation 658 are repeated again after each iteration of operation 654.

In some embodiments, the operations of method 650 are performed in accordance with the algorithms described above with reference to solving the optimization problem of Equation 1.

In some embodiments, method 650 implemented by FSVFL system 600 may exhibit certain advantages and/or certain disadvantages relative to method 400 implemented by FSVFL system 300 in some circumstances. In particular, method 650 may improve efficiency relative to method 400, at the price of sacrificing some security. Method 650 may be more efficient than method 400 because the system 600 can only be trained asynchronously, i.e., in each communication round the active parties (102a through 102b) can make multiple gradient steps to update their models. However, method 650 may be less secure than method 400 because the active parties (102a through 102b) may be able to infer the outputs 360 of other parties because the summation of the outputs (i.e. aggregated prediction 602) are transmitted to the active parties.

It will be appreciated that in the FSVL system 300, 500, and 600, the computing system 102 of the task owner shares with the server 110 the labels 302, the protected class information 304, and the definition of the loss function related to the task T. Hence, the server 110 can compute the loss and the fairness constraint function (i.e., the DEO) by itself. However, in the FSVL system 700 described below with reference to FIG. 7A, not only does the server 100 not have access to a global model 126 (as in system 600), but the server 110 also does not have access to the labels 302, the protected information 304, or the definition of the loss function related to the task T. Thus, the server 110 has to communicate with the computing system 102a of the task owner to compute the loss and the fairness constraint function, and to generate partitions 354. Thus, those calculations are instead performed by the computing system 102a of the task owner, and the server 110 acts only to distribute this information to the other computing systems 102 and aggregate the outputs 360 of the local models 136.

Figure 7A:
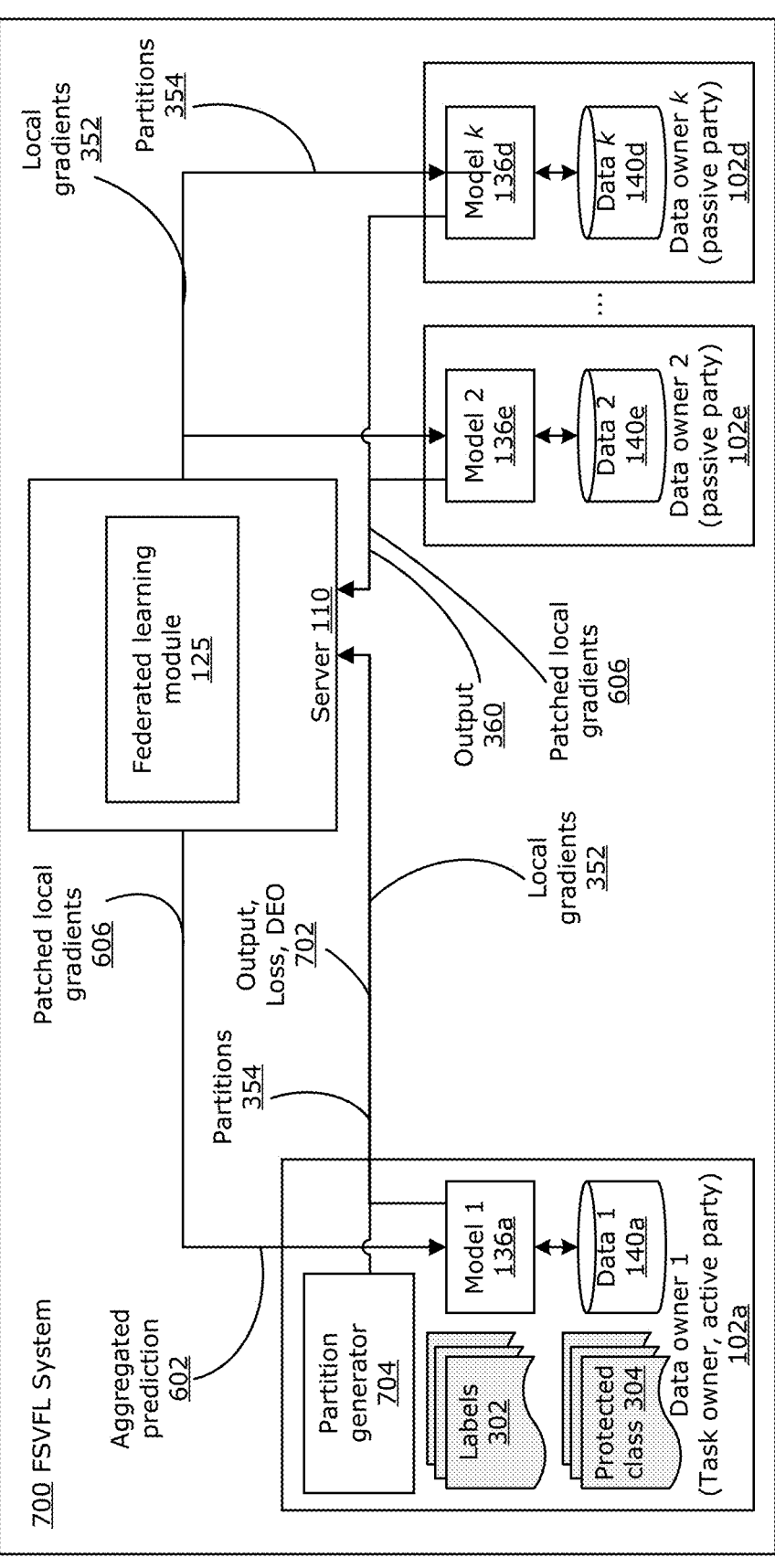
FIG. 7A is a block diagram of another example of a FSVFL system according to an embodiment of the present disclosure.

FIG. 7A shows another example embodiment of a FSVFL system 700 in which the computing system 102 of the task owner privately stores the labels related to the task T. In the FSVFL system 700, the computing system 102 of the task owner communicates with the server 110 to compute the loss and the fairness constraint function and obtain partition. It will be appreciated that components in the FSVFL system 700 which are similar to the components in the FSVFL systems 100, 300, 500, 600 are indicated using the same reference numeral. The training performed by the FSVFL system 700 will now be described with reference to FIG. 7B.

Figure 7B:
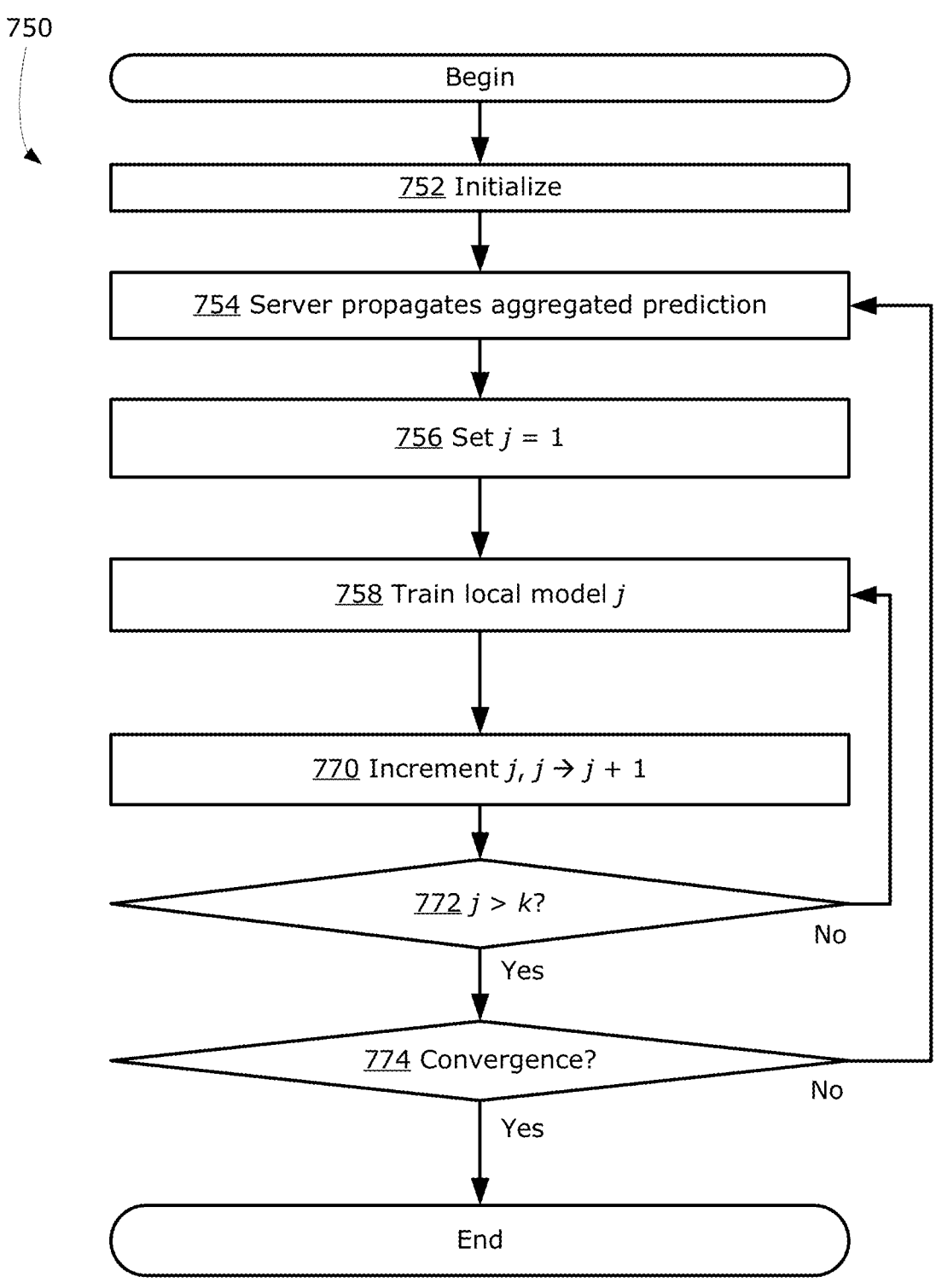
FIG. 7B is a flowchart of a method for training performed by the FSVFL system of FIG. 7A.

FIG. 7B is a flowchart showing operations of an example method 750 for training a model using fair and secure vertical federated learning, using the FSVFL system 700 of FIG. 7B. In the described example, the operations performed by the server 110 are performed by the federated learning module 125, and the operations of each computing system 102 are performed by the instructions 139, each using the available model(s) and data as applicable to perform the operations. Steps in the method 750 which are similar to the steps of method 400 or 600 are indicated using the same reference numeral.

The FSVFL system 700 does not have any active parties other than the task owner, controlling computing system 102a. The first passive party is therefore data owner 2, controlling computing system 102e.

The training of the FSVFL system 700 includes the computing systems 102 of all data owner performing pre-training of their local (i.e. private) models. The pre-training of a local model 136 performed by a computing system 102 of data owner j, j∈{1, . . . , k} is as follows.

At 752, as in step 402 of method 400, an initialization operation is performed. As in step 402, the server 110 collects anonymized data sample IDs from the data samples of local datasets 140 of the computing systems 102 of all data owners and uses the data sample IDs to align the data samples from all training datasets $X_1$, . . . , $X_k$. The computing system 102a of data owner 1 becomes a task owner and an active party by initiating a task T. Notably, as distinct from step 402 of method 400 or step 652 of method 600, at step 752 the task owner computing system 102a does not send the labels 302 or protected class information 304 to the server 110 or to the trusted data owners (i.e., the computing systems 102 controlled by other active parties, such as 102b).

The computing system 102a of the task owner then randomly initializes the learnable parameters 137 (i.e. $\theta_1$) of its local model 136a and sends a task initiation request to the server 110. However, unlike at step 402, computing system 102a does not send the fairness constraint threshold (hyperparameter ε) to the server 110.

The server 110 then broadcasts the task initiation request to the computing systems 102 of the other data owners 2 through k (i.e. 102e through 102d). Based on the task initiation request received from the server 110, the computing systems 102 of the data owners 2 through k randomly initialize the learnable parameters 137 of their own local models 136. The computing systems 102 of the other data owners 2 through k (i.e. 102e through 102d) become passive parties.

At 754, the server 110 propagates the aggregated prediction 602. As in step 404 of method 400, the computing systems 102 of all data owners 1 through k compute their model outputs 360, $o_1$, . . . , $o_k$, and send the outputs 360 to the server 110.

Next, as in step 654, the server 110 computes the aggregated prediction 602, $o_0$, as the sum of the outputs 360:

$$o_0 = \sum\nolimits_{i=1}^{k} o_i.$$

The server 110 sends the aggregated prediction 602 $o_0$ to the computing system 102a of the task owner (i.e., data owner 1).

Based on the aggregated prediction 602 $o_0$, the task owner computing system 102a uses its labels 302 to compute:

The loss related to the task T;

The DEO (i.e. $|\hat{I}^a(\theta) - \hat{I}^b(\theta)|$); and

The aggregated gradients 604 of the aggregated prediction 602, $$\frac{\partial \, \text{Loss}}{\partial o_0}, \frac{\partial DEO}{\partial o_0}.$$

The computing system 102a sends these three computed results back to the server 110. It will be appreciated that these three computations are the same computations performed in step 652 of method 600, with the difference being that in method 700 they are performed by computing system 102a not by the server 110.

Based on the calculated DEO (i.e. $|\hat{I}^a(\theta) - \hat{I}^b(\theta)|$), the server 110 updates λ. The server 110 then broadcasts λ and aggregated gradients 604

$$\frac{\partial \, \text{Loss}}{\partial o_0}, \frac{\partial DEO}{\partial o_0}$$

to the computing system 102 of each passive data owner (i.e., 102e through 102d).

The computing system 102a generates random partitions 354 of positively labeled samples $P_1$, . . . , $P_N$ and sends the partitions 354 to the server 110. The server 110 then sends the partitions 354 to the computing systems 102e through 102d of the passive parties.

Each computing system 102e through 102d of a passive party then computes its patched local gradients 606:

$$\sum_{s \in P_i} \frac{\partial DEO}{o_0} \frac{\partial o_0}{X_j^{p,s}}, i = 1, \dots, N$$

The patched local gradients 606 are sent to the server 110 from the computing system 102 of each passive party j. The server 110 then sends all patched local gradients 606 to the computing system 102a of the task owner.

Based on the received patched local gradients 606, the computing system 102a of the task owner computes and sends a further local gradient 352

$$\frac{\partial DEO}{\partial \theta_j}$$

for each passive party j to the server 110. The server 110 distributes each respective further local gradient 352

$$\frac{\partial DEO}{\partial \theta_j}$$

to the computing system 102 of the respective passive party j.

As shown in FIG. 7B, step 754 is iterated until a convergence condition is satisfied at step 664.

At 756, the first computing system 102a is identified by setting j=1.

At 758, local model j (i.e., in the first iteration of 758, local model 136a) is trained. The computing systems 102 of all data owners 1 through k compute their model outputs 360, $o_1, \ldots, o_k$, and send the model outputs 360 to the server 110.

For the first iteration of step 758, i.e. training local model 102a the computing system 102a of the task owner uses its labels 302 to compute:

The loss related to the task T;

The DEO (i.e. $|\hat{l}^a(\theta) - \hat{l}^b(\theta)|$); and

The aggregated gradients 604 of the aggregated prediction 602, $$\frac{\partial Loss}{\partial o_0}, \frac{\partial DEO}{\partial o_0}.$$

The computing system 102a sends these three computed results back to the server 110. It will be appreciated that these three computations are the same computations performed in step 754.

Based on the gradient $$\frac{\partial Loss}{\partial o_0}, \frac{\partial DEO}{\partial o_0},$$

the computing system 102a computes $$\frac{\partial Loss}{\partial \theta_1}, \frac{\partial DEO}{\partial \theta_1}$$

and updates its learnable model parameters 137a, $\theta_1$. The computing system 102a of the task owner then computes and sends $$\frac{\partial DEO}{\partial \theta_1}$$

to the server 110.

As at step 408, an iteration of operation 758 proceeds differently once j is incremented to a value indicating a passive party, i.e. after the first iteration, i.e. when j≥1. As with the task owner, first, the computing systems 102 of all data owners 1 through k compute their model outputs 360, $o_1, \ldots, o_k$, and send model outputs 360 to the server 110. Second, based on the aggregated gradient 604, $$\frac{\partial Loss}{\partial o_0},$$

received from the server 110, the computing system 102 of passive party j computes $$\frac{\partial Loss}{\partial \theta_j}.$$

Third, based on the aggregated gradient 604

$$\frac{\partial DEO}{\partial o_0}$$

and the partitions 354 received from the server 110, $P_1, \ldots, P_N$, the computing system 102 of the passive party j computes its patched local gradients 606:

$$\sum_{s \in P_i} \frac{\partial DEO}{o_0} \frac{\partial o_0}{X_j^{p,s}}, i = 1, \ldots, N$$

and sends the patched local gradients 606 to the server 110. Fourth, based on the local gradient 352, $$\frac{\partial DEO}{\partial \theta_j},$$

received from the server 110, the passive party j updates its local learnable model parameters 137 (i.e. $\theta_j$).

As shown in FIG. 7B, step 758 is iterated for each data owner (i.e. until j>k at step 762). At 770, the value of j is incremented (j→j+1), and at 772, if j>k, then the method advances to operation 774, otherwise the method 750 returns to operation 758. These k iterations of operation 758 are repeated again after each iteration of operation 754.

In some embodiments, the operations of method 650 are performed in accordance with the algorithms described above with reference to solving the optimization problem of Equation 1.

In some embodiments, method 750 implemented by FSVFL system 700 may exhibit certain advantages and/or certain disadvantages relative to method 650 implemented by FSVFL system 600 in some circumstances. In particular, method 750 may improve security relative to method 650, at the price of increasing communication cost. Method 750 may be more secure than method 650 because in system 700 the labels 302, the protected class information 304, and the loss function definition related to the private task T are privately held by the task owner. However, method 750 may exhibit increased communication cost between the server 110 and the task owner's computing system 102a when computing the loss.

In various examples described herein, the condition of convergence may be satisfied by any combination of one or more convergence conditions known in the field of machine learning, including one or more of the following conditions:

The number of iterations exceeds a maximum number of iterations specified by the user.

The change of loss between the previous iteration and the current iteration is smaller than a user specified threshold.

The 2-norm of the gradient (i.e. the square root of the squares of the gradient vector elements) is smaller than a user specified threshold

General

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for training a primary machine learning model using vertical federated learning, comprising:

obtaining a plurality of labels, each label identifying a ground truth prediction for a feature of a data sample of a plurality of data samples;

obtaining protected class information identifying one or more protected classes;

generating partition data identifying one or more positive data samples of the plurality of data samples, each positive data sample being associated with a label having a positive ground truth prediction indicating positive membership of the data sample in a class of a plurality of classes;

performing a plurality of training iterations, wherein performing a training iteration includes:

obtaining, from each computing system of a plurality of computing systems, an output of a local machine learning model of the computing system based on a local dataset of the computing system;

processing the outputs of the plurality of computing systems to generate a prediction;

processing the prediction and the one or more labels to generate a loss;

processing the loss and the protected class information to generate an unfairness measure indicating a degree to which the prediction is affected by a given data sample's positive membership in a protected class;

processing the loss to generate a loss gradient for training the primary machine learning model;

processing the unfairness measure to generate a unfairness gradient for training the primary machine learning model;

adjusting a plurality of learnable parameters of the primary machine learning model based on the loss gradient and the unfairness gradient; and for each of one or more passive computing systems of the plurality of computing systems:

computing a local loss gradient for training the local machine learning model of the passive computing system;

computing a local unfairness gradient for training the local machine learning model of the passive computing system;

sending the partition data, the local loss gradient, and the local unfairness gradient to the passive computing system;

receiving a set of patched local gradients for the local machine learning model of the passive computing system, based on the local unfairness gradient;

processing the patched local gradients to compute a further unfairness gradient; and sending the further unfairness gradient to the passive computing system;

wherein the training iterations are performed until a convergence condition is satisfied.

2. The method of claim 1, wherein:

the plurality of local machine learning models includes the primary machine learning model;

the plurality of computing systems includes a task owner computing system comprising the primary machine learning model;

processing the outputs of the plurality of computing systems to generate a prediction comprises providing the outputs to a global machine learning model to generate a global prediction;

the loss gradient for training the primary machine learning model is generated by processing the loss and the global machine learning model;

the unfairness gradient for training the primary machine learning model is generated by processing the unfairness measure and the global machine learning model; and adjusting the plurality of learnable parameters of the primary machine learning model based on the loss gradient and the unfairness gradient comprises:

sending the loss gradient and the unfairness gradient to the task owner computing system; and at the task owner computing system, adjusting the plurality of learnable parameters of the primary machine learning model based on the loss gradient and the unfairness gradient.

3. The method of claim 1, wherein:

the plurality of local machine learning models includes the primary machine learning model;

the plurality of computing systems includes a task owner computing system comprising the primary machine learning model;

processing the outputs of the plurality of computing systems to generate a prediction comprises summing the outputs to generate the prediction, the prediction being an aggregated prediction;

the loss gradient for training the primary machine learning model is generated by processing the loss and the aggregated prediction;

the unfairness gradient for training the primary machine learning model is generated by processing the unfairness measure and the aggregated prediction; and adjusting the plurality of learnable parameters of the primary machine learning model based on the loss gradient and the unfairness gradient comprises:

sending the loss gradient and the unfairness gradient to the task owner computing system; and at the task owner computing system, adjusting the plurality of learnable parameters of the primary machine learning model based on the loss gradient and the unfairness gradient.

4. The method of claim 1, wherein:

the plurality of local machine learning models includes the primary machine learning model;

the plurality of computing systems includes a task owner computing system comprising the primary machine learning model;

obtaining the outputs of the plurality of computing systems comprises:

receiving the outputs at a server; and sending the outputs from the server to the task owner computing system;

processing the outputs of the plurality of computing systems to generate a prediction comprises summing the outputs, at the task owner computing system, to generate the prediction, the prediction being an aggregated prediction;

the loss gradient for training the primary machine learning model is generated by processing the loss and the aggregated prediction;

the unfairness gradient for training the primary machine learning model is generated by processing the unfairness measure and the aggregated prediction at the task owner computing system; and adjusting the plurality of learnable parameters of the primary machine learning model based on the loss gradient and the unfairness gradient comprises, at the task owner computing system, adjusting the plurality of learnable parameters of the primary machine learning model based on the loss gradient and the unfairness gradient.

5. The method of claim 1, wherein the unfairness measure is a difference in equal opportunity (DEO) measure.

6. The method of claim 1, wherein the prediction is a multi-dimensional prediction comprising a prediction with respect to each data sample of a plurality of data samples represented in the local datasets.

7. The method of claim 6, wherein the plurality of data samples represented in the local datasets comprise a plurality of vertically partitioned data samples.

8. The method of claim 1, further comprising repeating one or more times the steps of: obtaining the outputs, processing the outputs, generating the loss, generating the unfairness measure, generating the loss gradient, generating the unfairness gradient, adjusting the plurality of learnable parameters of the primary machine learning model, generating the partition data, and for each passive computing system, the steps of:

computing the local loss gradient;

computing the local unfairness gradient;

sending the partition data, the local loss gradient, and the local unfairness gradient to the passive computing system;

receiving the set of patched local gradients;

computing the further unfairness gradient; and sending the further unfairness gradient to the passive computing system.

9. The method of claim 1, further comprising, for each passive computing system:

at the passive computing system:

processing the local unfairness gradient, using the local machine learning model, to generate the set of patched local gradients;

sending the set of patched local gradients;

receiving the further unfairness gradient; and adjusting a plurality of learnable parameters of the local machine learning model based on the further unfairness gradient.

10. A server comprising:

a processing device; and a memory storing thereon machine-executable instructions which, when executed by the processing device, cause the server to train a primary machine learning model stored on a task owner computing system, using vertical federated learning, by:

obtaining a plurality of labels, each label identifying a ground truth prediction for a feature of a data sample of a plurality of data samples;

obtaining protected class information identifying one or more protected classes;

generating partition data identifying one or more positive data samples of the plurality of data samples, each positive data sample being associated with a label having a positive ground truth prediction indicating positive membership of the data sample in a class of a plurality of classes;

performing a plurality of training iterations, wherein performing a training iteration includes:

obtaining, from each computing system of a plurality of computing systems, an output of a local machine learning model of the computing system based on a local dataset of the computing system;

processing the outputs of the plurality of computing systems to generate a prediction;

processing the prediction and the one or more labels to generate a loss;

processing the loss and the protected class information to generate an unfairness measure indicating a degree to which the prediction is affected by a given data sample's positive membership in a protected class;

processing the loss to generate a loss gradient for training the primary machine learning model;

processing the unfairness measure to generate a unfairness gradient for training the primary machine learning model;

sending the loss gradient and the unfairness gradient to the task owner computing system for training of the primary machine learning model; and for each of one or more passive computing systems of the plurality of computing systems:

computing a local loss gradient for training the local machine learning model of the passive computing system;

computing a local unfairness gradient for training the local machine learning model of the passive computing system;

sending the partition data, the local loss gradient, and the local unfairness gradient to the passive computing system;

receiving a set of patched local gradients for the local machine learning model of the passive computing system, based on the local unfairness gradient;

processing the patched local gradients to compute a further unfairness gradient; and sending the further unfairness gradient to the passive computing system;

wherein the training iterations are performed until a convergence condition is satisfied.

11. The server of claim 10, wherein:

the memory stores a global machine learning model;

the plurality of local machine learning models includes the primary machine learning model;

the plurality of computing systems includes the task owner computing system;

processing the outputs of the plurality of computing systems to generate a prediction comprises providing the outputs to a global machine learning model to generate a global prediction;

the loss gradient for training the primary machine learning model is generated by processing the loss and the global machine learning model; and the unfairness gradient for training the primary machine learning model is generated by processing the unfairness measure and the global machine learning model.

12. The server of claim 10, wherein:

the plurality of local machine learning models includes the primary machine learning model;

the plurality of computing systems includes the task owner computing system;

processing the outputs of the plurality of computing systems to generate a prediction comprises summing the outputs to generate the prediction, the prediction being an aggregated prediction;

the loss gradient for training the primary machine learning model is generated by processing the loss and the aggregated prediction; and the unfairness gradient for training the primary machine learning model is generated by processing the unfairness measure and the aggregated prediction.

13. The server of claim 10, wherein the unfairness measure is a difference in equal opportunity (DEO) measure.

14. The server of claim 10, wherein the prediction is a multi-dimensional prediction comprising a prediction with respect to each data sample of a plurality of data samples represented in the local datasets.

15. The server of claim 14, wherein the plurality of data samples represented in the local datasets comprise a plurality of vertically partitioned data samples.

16. The server of claim 10, wherein the machine-executable instructions, when executed by the processing device, further cause the server to repeating one or more times the steps of: obtaining the outputs, processing the outputs, generating the loss, generating the unfairness measure, generating the loss gradient, generating the unfairness gradient, and sending the loss gradient and the unfairness gradient to the task owner computing system.

17. A non-transitory processor-readable medium having machine-executable instructions stored thereon which, when executed by a processor of a server, cause the server to train a primary machine learning model stored on a task owner computing system, using vertical federated learning, by:

obtaining a plurality of labels, each label identifying a ground truth prediction for a feature of a data sample of a plurality of data samples;

obtaining protected class information identifying one or more protected classes;

generating partition data identifying one or more positive data samples of the plurality of data samples, each positive data sample being associated with a label having a positive ground truth prediction indicating positive membership of the data sample in a class of a plurality of classes;

performing a plurality of training iterations, wherein performing a training iteration includes:

obtaining, from each computing system of a plurality of computing systems, an output of a local machine learning model of the computing system based on a local dataset of the computing system;

processing the outputs of the plurality of computing systems to generate a prediction;

processing the prediction and the one or more labels to generate a loss;

processing the loss and the protected class information to generate an unfairness measure indicating a degree to which the prediction is affected by a given data sample's positive membership in a protected class;

processing the loss to generate a loss gradient for training the primary machine learning model;

processing the unfairness measure to generate a unfairness gradient for training the primary machine learning model;

sending the loss gradient and the unfairness gradient to the task owner computing system for training of the primary machine learning model; and for each of one or more passive computing systems of the plurality of computing systems:

computing a local loss gradient for training the local machine learning model of the passive computing system;

computing a local unfairness gradient for training the local machine learning model of the passive computing system;

sending the partition data, the local loss gradient, and the local unfairness gradient to the passive computing system;

receiving a set of patched local gradients for the local machine learning model of the passive computing system, based on the local unfairness gradient;

processing the patched local gradients to compute a further unfairness gradient; and sending the further unfairness gradient to the passive computing system;

wherein the training iterations are performed until a convergence condition is satisfied.

18. The non-transitory processor-readable medium of claim 17, wherein the unfairness measure is a difference in equal opportunity (DEO) measure.

19. The non-transitory processor-readable medium of claim 17, wherein the prediction is a multi-dimensional prediction comprising a prediction with respect to each data sample of a plurality of data samples represented in the local datasets.

20. The non-transitory processor-readable medium of claim 19, wherein the plurality of data samples represented in the local datasets comprise a plurality of vertically partitioned data samples.

\*    \*    \*    \*    \*